(12) United States Patent
Tamada et al.

(10) Patent No.: US 7,143,876 B2
(45) Date of Patent: Dec. 5, 2006

(54) IMPACT ABSORBING MEMBER FOR VEHICLE

(75) Inventors: Teruo Tamada, Yokohama (JP); Hiroo Inui, Nagoya (JP); Kiyotaka Urakawa, Katano (JP); Kenji Ishii, Nagoya (JP); Tadatoshi Tanji, Fujisawa (JP)

(73) Assignee: Kyoraku Co., Ltd., Kyoto (JP)

( * ) Notice: Subject to any disclaimer, the term of this patent is extended or adjusted under 35 U.S.C. 154(b) by 54 days.

(21) Appl. No.: 10/698,314

(22) Filed: Oct. 31, 2003

(65) Prior Publication Data
US 2004/0124572 A1    Jul. 1, 2004

(30) Foreign Application Priority Data
Oct. 31, 2002 (JP) ............................. 2002-319160
Oct. 31, 2002 (JP) ............................. 2002-319161

(51) Int. Cl.
*F16F 7/12* (2006.01)
*F16F 5/00* (2006.01)

(52) U.S. Cl. .................. 188/371; 267/140.11; 293/120

(58) Field of Classification Search ................ 267/136, 267/139, 140, 140.11, 141.3; 188/371, 376, 188/377; 293/120, 132, 135, 136
See application file for complete search history.

(56) References Cited

U.S. PATENT DOCUMENTS 3,933,387 A * 1/1976 Salloum et al. ............. 293/120
4,375,108 A * 3/1983 Gooding ......................... 2/413
5,065,555 A * 11/1991 Kobori et al. ............. 52/167.7
5,836,641 A * 11/1998 Sugamoto et al. ...... 296/187.05
6,406,079 B1 * 6/2002 Tamada et al. ............. 293/120

FOREIGN PATENT DOCUMENTS

| JP | 10-250513 |   | 9/1998 |
| JP | 2000108826 A | * | 4/2000 |
| JP | 2002187508 |   | 7/2002 |
| JP | 2002201322 |   | 7/2002 |

* cited by examiner

*Primary Examiner*—Melody M. Burch
(74) *Attorney, Agent, or Firm*—Maine & Asmus

(57) ABSTRACT

A system is disclosed for absorbing impact energy to a vehicle. The system provides first and second blow molded thermoplastic energy absorbing members, each of the energy absorbing member having opposing first wall and a second walls, at least one rib disposed within each energy absorbing member, that rib being integrally molded from at least the first wall. Also provided is a joint whereby the rib attaches to the second wall such that the first and second energy absorbing members absorb an impact energy. The first and second energy absorbing members are aligned such that the impact energy is distributed between the energy absorbing members and is absorbed by the energy absorbing members.

20 Claims, 18 Drawing Sheets

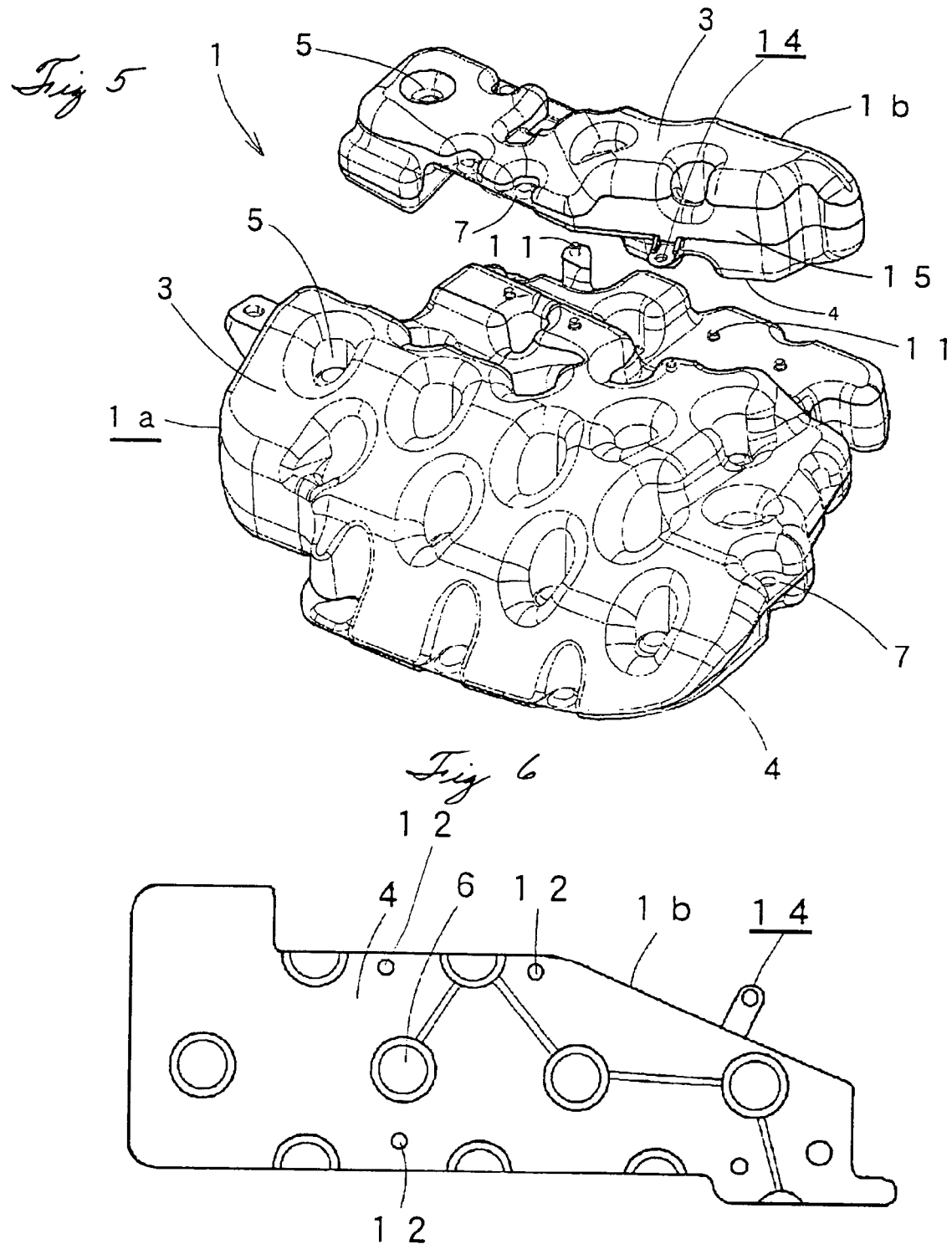

ID-IMPACT ABSORBING MEMBER FOR VEHICLE

RELATED APPLICATIONS

This application claims the priority to Japanese Application Number 2002-319160 filed Oct. 31, 2002, Japanese Application Number 2002-319161 filed Oct. 31, 2002, Japanese Application Number 2002-319162 filed Oct. 31, 2002, Japanese Application Number 2002-319163 filed Oct. 31, 2002, Japanese Application Number 2003-025254 filed Jan. 31, 2003, Japanese Application Number 2003-025255 filed Jan. 31, 2003, Japanese Application Number 2003-025256 filed Jan. 31, 2003, Japanese Application Number 2003-025257 filed Jan. 31, 2003, Japanese Application Number 2003-025258 filed Jan. 31, 2003, Japanese Application Number 2003-054856 filed Feb. 28, 2003, Japanese Application Number 2003-054857 filed Feb. 28, 2003, Japanese Application Number 2003-054858 filed Feb. 28, 2003, Japanese Application Number 2003-097349 filed Mar. 31, 2003, and Japanese Application Number 2003-135249 filed on May 14, 2003.

FIELD OF THE INVENTION

The present invention relates to an energy absorbing member and more particularly, to an energy absorbing member provided inside a vehicle structural member such as a door, a door trim, a body side panel, a roof panel, a pillar, and a bumper, for absorbing the impact energy from the inside such as the collision of a passenger against the inner wall of the vehicle structural member or the impact energy from the outside such as the collision with another vehicle.

BACKGROUND OF THE INVENTION

The safety of passengers and drivers in motor vehicle accidents depends in large part on the construction and performance of energy absorbing components within the vehicle's body. These components are designed to absorb the impact energy of a collision, and to prevent the transfer of that impact energy to the occupant of the vehicle. The official gazette of Japanese Patent No. 3,313,999, Publication Number 10-250513, issued to KYORAKU CO. LTD. and NAGASE & CO. LTD., which is hereby incorporated in its entirety for all purposes, discloses one such component having a hollow double wall structure, produced by blow molding of thermoplastics, and having recessed ribs from the front surface wall and the rear surface wall with the top end parts thereof bonded with each other so as to be integrated for improving the energy absorbing property.

Since this kind of the energy absorbing member for a vehicle is to be disposed inside a vehicle constituent member such as a door and a body side panel, the dimensions of the component are dependant on the size of the cavity available. When the dimensions of the component are such that the ribs become elongate, as is illustrated in FIG. 33 of the present invention, the thickness of the walls of the rib becomes reduced as the parison becomes stretched too thin. This reduction in thickness reduces the strength of the rib and the ability of the rib to absorb impact energy.

BRIEF SUMMARY OF THE INVENTION

One embodiment of the present invention provides a system for absorbing an impact energy, that system comprising: first and second blow molded thermoplastic energy absorbing members; each energy absorbing member having opposing first and second walls defining a hollow space; at least one pair of joined first and second ribs disposed within each the energy absorbing member, the first rib being integrally molded from the first wall, the second rib being integrally molded from the second wall; a joint disposed between the first and second ribs; and wherein the first and second energy absorbing members are aligned such that the impact energy is distributed between the energy absorbing members and absorbed by the energy absorbing members.

Another embodiment of the present invention provides such a system wherein the first energy absorbing member and the second energy absorbing member have different sizes.

Another embodiment of the present invention provides such a system wherein the first energy absorbing member and the second energy absorbing member are aligned such that at least one pair of ribs from the first energy absorbing member is aligned coaxially with at least one pair of ribs from the second energy absorbing member.

A further embodiment of the present invention provides such a system wherein the first energy absorbing member and the second energy absorbing member are interlocked with each other via a thin part.

Yet another embodiment of the present invention provides such a system wherein a projecting part is disposed in the first wall of the first energy absorbing member, and a receiving part for receiving the projecting part is disposed in the second wall of the second energy absorbing member.

A yet further embodiment of the present invention provides such a system wherein the receiving part is a recessed part.

Still another embodiment of the present invention provides such a system wherein the receiving part is a through hole.

A still further embodiment of the present invention provides such a system wherein an interlocking piece is disposed on at least one of the energy absorbing members in such a way as to align the first and second energy absorbing members.

Even another embodiment of the present invention provides such a system wherein a projecting part is formed in the interlocking piece.

An even further embodiment of the present invention provides such a system wherein a through hole is formed in the interlocking piece.

Yet still another embodiment of the present invention provides such a system, wherein the interlocking piece is formed integrally on a side surface of the energy absorbing member via a thin part.

A yet still further embodiment of the present invention provides such a system wherein the interlocking piece is formed in the vicinity of a parting line formed on a side surface linking the first and second wall of the energy absorbing member.

Another embodiment of the present invention provides such a system wherein the interlocking piece is pressured and formed by a parting surface of a split mold during blow molding.

Yet another embodiment of the present invention provides such a system further comprising a stopping member coupling the interlocking piece to an adjacent energy absorbing member.

A yet further embodiment of the present invention provides such a system wherein a plurality of the energy absorbing members are interlocked and fixed by fitting the interlocking piece to an adjacent energy absorbing member.

Still another embodiment of the present invention provides such a system wherein a plurality of energy absorbing members are interlocked and fixed integrally by welding the interlocking piece to an adjacent energy absorbing member.

A still further embodiment of the present invention provides such a system wherein a plurality of the energy absorbing members are interlocked and fixed by coupling a first interlocking piece from one energy absorbing member to a second interlocking piece from an adjacent energy absorbing member.

Even another embodiment of the present invention provides such a system further comprising a stopping member inserted through the first and second interlocking pieces.

An even further embodiment of the present invention provides such a system wherein a plurality of interlocking pieces are snapped together or welded together.

A still yet further embodiment of the present invention provides such a system further comprising a stopping member inserted through a plurality of welded surfaces.

Even yet another embodiment of the present invention provides such a system further comprising at least one additional blow molded thermoplastic energy absorbing member, the energy absorbing members are aligned such that the impact energy is distributed between the energy absorbing members and absorbed by the energy absorbing members.

Another embodiment of the present invention provides a system for absorbing an impact energy, that system comprising: first and second energy absorbing members, each energy absorbing member having opposing first and second walls defining a hollow space; at least one rib disposed within each energy absorbing member, the rib being integrally molded from at least the first wall; a joint whereby the rib attaches to the second wall; and wherein the energy absorbing members are aligned such that at least one rib from each energy absorbing member is aligned and the impact energy is distributed between the energy absorbing members and absorbed by the energy absorbing members.

A further embodiment of the present invention provides such a system wherein each the energy absorbing members has a different size.

Yet another embodiment of the present invention provides such a system wherein the first energy absorbing member and the second energy absorbing member are aligned such that at least one rib from the first energy absorbing member is aligned coaxially with at least one rib from the second energy absorbing member so as to be provided continuously in the direction of an impact energy.

A yet further embodiment of the present invention provides such a system wherein the plurality of the energy absorbing members are coupled via a thin part.

Still another embodiment of the present invention provides such a system further comprising a projecting part disposed in the first energy absorbing member, and a receiving part disposed in the second energy absorbing member for receiving the projecting part.

A still further embodiment of the present invention provides such a system further comprising an interlocking piece disposed on a side surface linking the first and second walls of at least one of the energy absorbing members.

Still yet another embodiment of the present invention provides such a system further comprising a stopping member coupling the interlocking piece to an adjacent said energy absorbing member.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 5 is a perspective view of an energy absorbing member according to another embodiment with a projecting part formed according to one embodiment of the invention.

FIG. 6 is a back view showing the other energy absorbing member of FIG. 5.

DETAILED DESCRIPTION OF THE INVENTION

Figure 1:
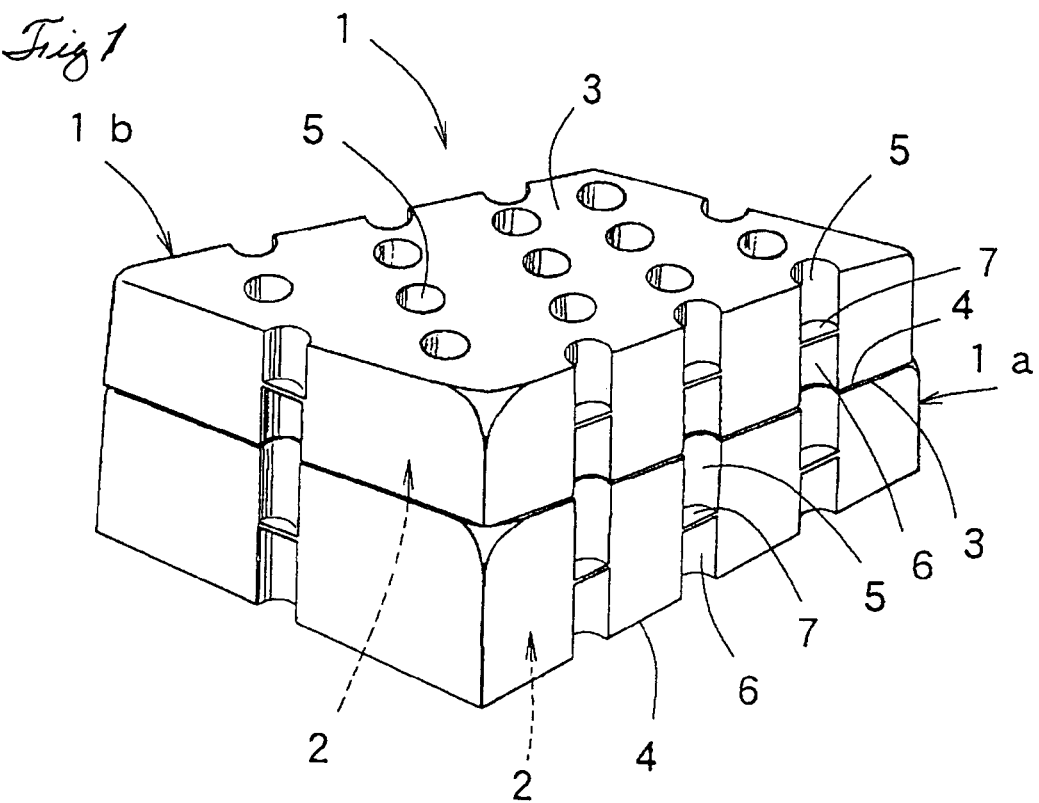
FIG. 1 is a perspective view showing an energy absorbing member according to an embodiment of the present invention.
Figure 32:
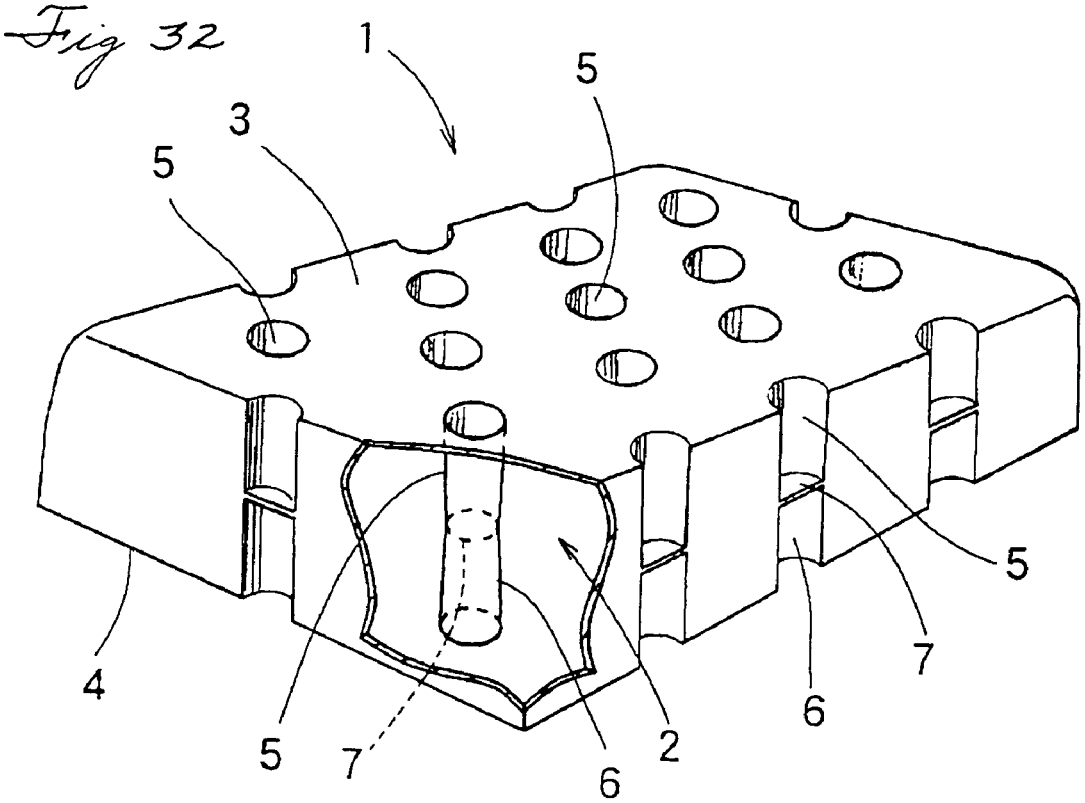
FIG. 32 is a partially broken perspective view of an energy absorbing member according to one embodiment of the invention.
Figure 33:
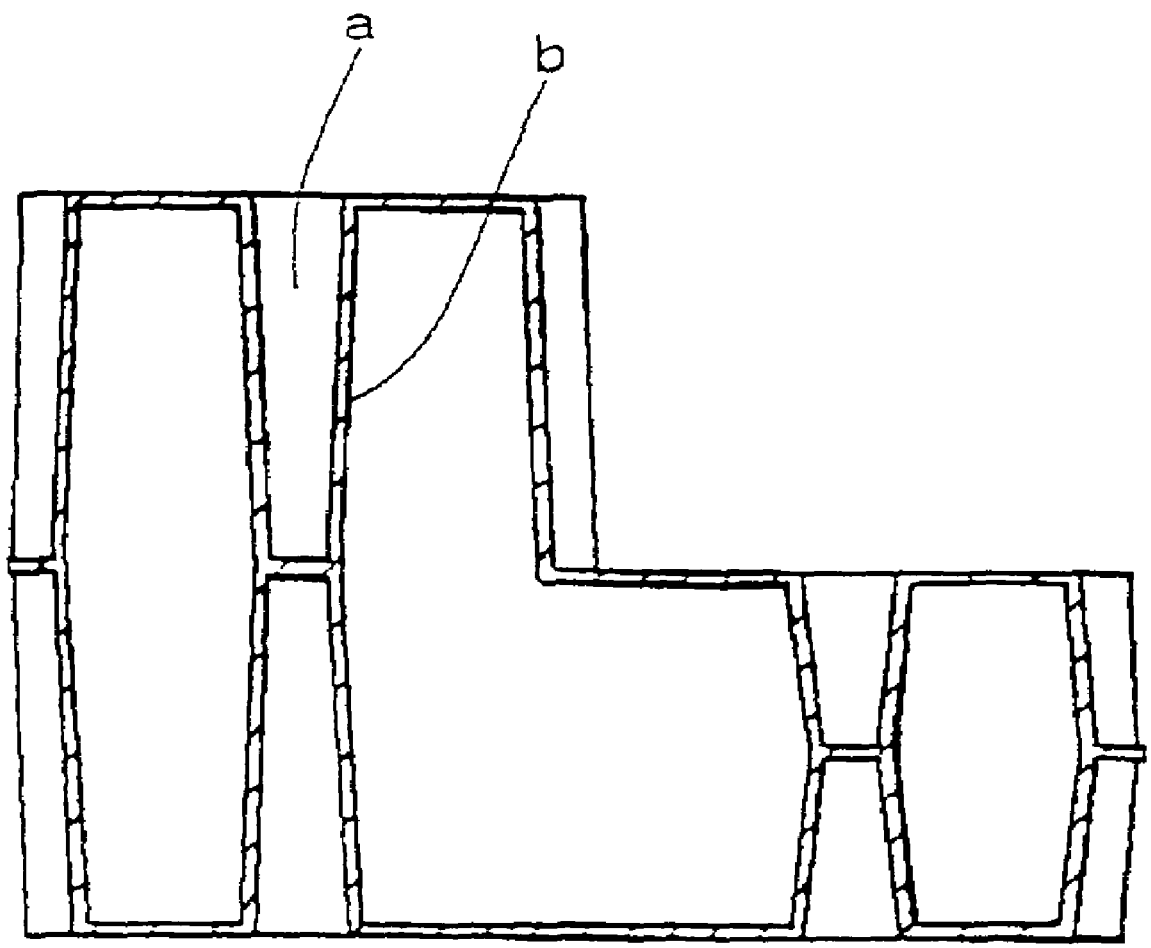
FIG. 33 is a cross-sectional view showing a conventional embodiment.

In FIG. 1, the reference numeral 1 denotes an energy absorbing member. The energy absorbing member 1 comprises a first energy absorbing member 1a and second energy absorbing member 1b superimposed. As shown in FIG. 32, the first energy absorbing member 1a made of thermoplastics, formed integrally by blow molding, has a hollow part 2, and a plurality of pairs of recessed ribs 5, 6 formed by each denting or otherwise molding both a first wall 3 and a second wall 4 facing with each other to the second. The first 3 and second 4 walls oppose each other across the hollow part 2. With the top end parts of the recessed ribs 5, 6 contacted with each other, a welded surface or a joint 7 is provided. Since the second energy absorbing member 1b has the same configuration as that of the first energy absorbing member 1a, the same reference numerals are applied to the same configuration parts, and explanation thereof is omitted.

The terms "superimposed", "superposition", and "superimposing" are intended not only to express the placement of the members on top of each other, but to express the placement of the members such that at least one wall of a first member is in close proximity to or in substantially direct contact with at least one wall of a second member. Such a configuration facilitates the transfer of impact energy from an impact energy to the second member, thus distributing and absorbing the impact energy.

Figure 24:
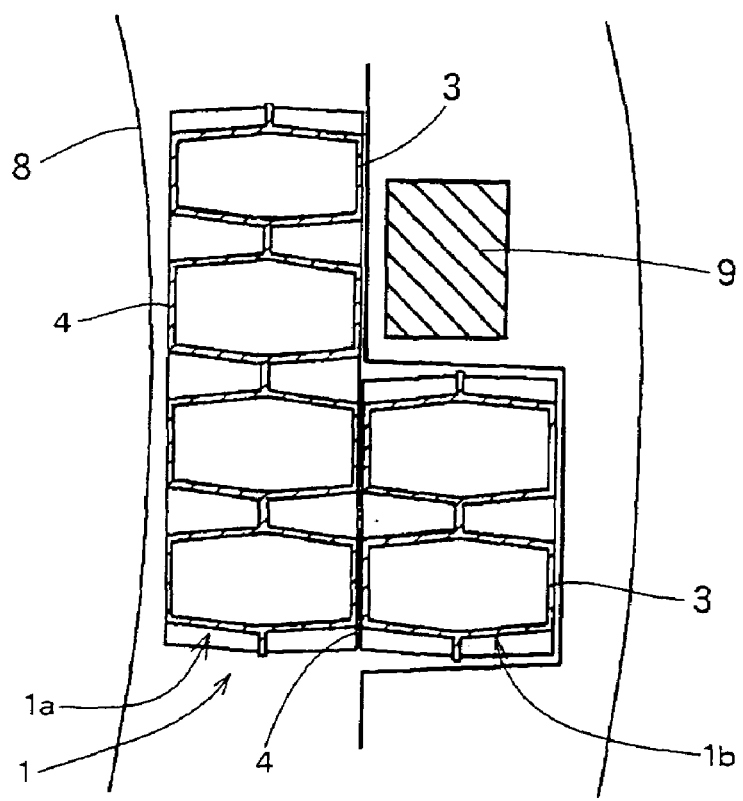
FIG. 24 is a cross-sectional view showing an embodiment with an energy absorbing member according to one embodiment of the invention provided inside a vehicle constituent member.

According to one embodiment illustrated in FIG. 24 the first energy absorbing member 1a and the second energy absorbing member 1b can be superimposed, coupled, aligned, fixed or otherwise positioned proximately. For example, in the embodiment shown in FIG. 24, the energy absorbing member 1 is disposed, avoiding another member 9 such that it comprises a part with the first energy absorbing member 1a and the other energy absorbing member 1b superimposed as shown in FIG. 2 and 3, and a part using only the first energy absorbing member 1a.

Figure 2:
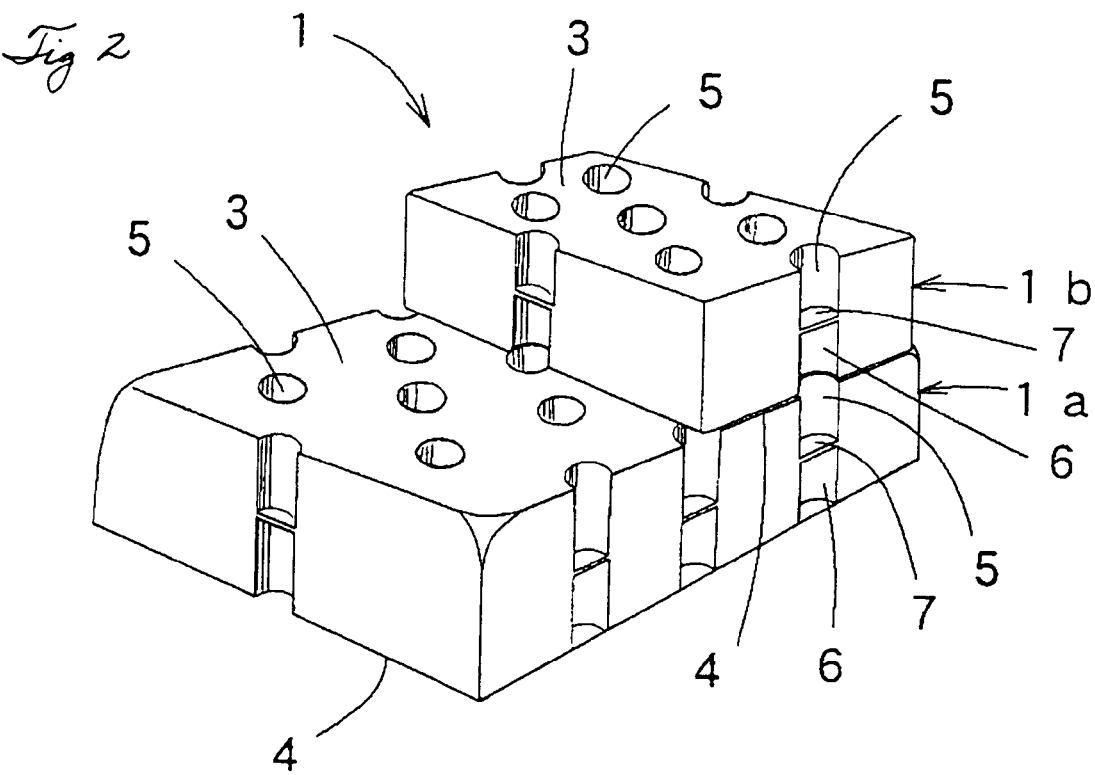
FIG. 2 is a perspective view showing an energy absorbing member according to another embodiment of the present invention.
Figure 3:
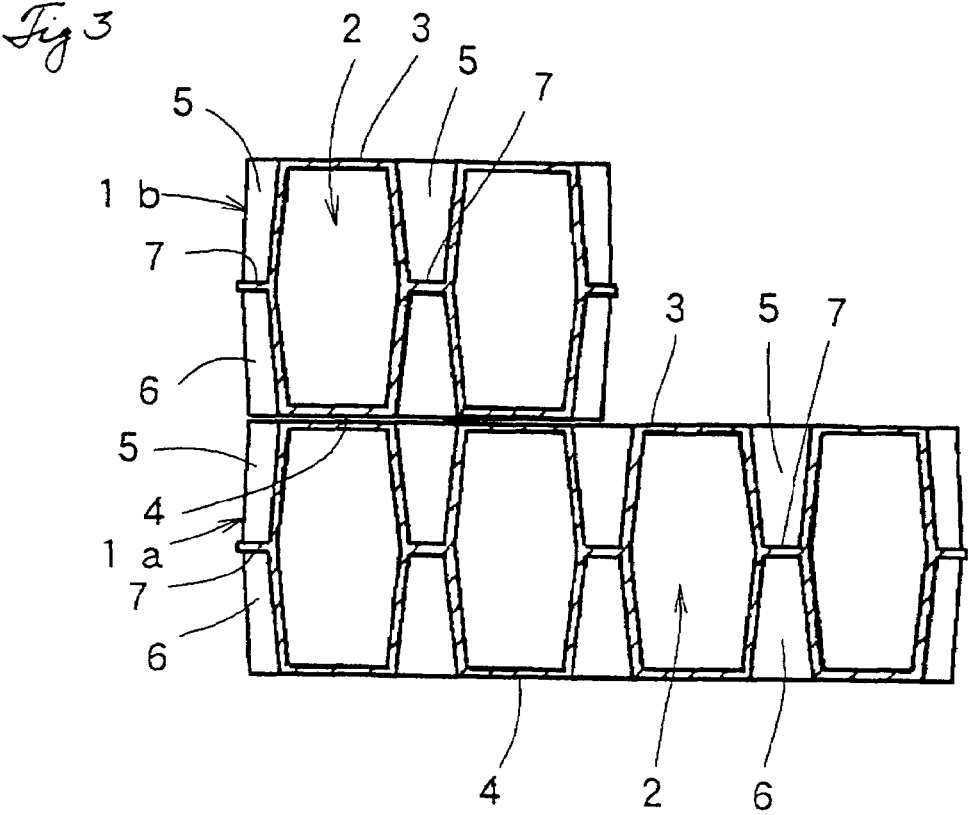
FIG. 3 is a cross-sectional view of FIG. 2.

That is, according to one embodiment of the present invention the first energy absorbing member 1a and the second energy absorbing member 1b comprising the energy absorbing member 1, the second energy absorbing member 1b may be provided slightly smaller than the first energy absorbing member 1a as shown in FIGS. 2 and 3. One skilled in the art will readily appreciate that a variety of sizes, shapes and configurations of energy absorbing members are within the scope of the present invention. The variety of sizes and shapes, among other potential benefits, allows the installer to vary the components as needed to fill cavities within the vehicle.

By providing a first energy absorbing member 1a and a second energy absorbing member 1b with different shapes, the energy absorbing member 1 can be distributed, preferably, within a vehicle configured according to the shape of the vehicle constituent member 8 even in the case the other member 9 is in the vehicle constituent member. Furthermore, the variable energy absorbing property can be provided to the members 1a, 1b superimposed, coupled, bonded, welded, and fixed. In FIG. 24, since the second energy absorbing member 1b is pushed out to the inside of the vehicle at the time of the side surface collision to the vehicle so that the passenger is collided from the first energy absorbing member 1a side, the dimensions of the energy absorbing members 1 superimposed in a plurality absorbs the impact energy effectively so that the demand of the complicated energy absorption in the vehicle can be satisfied.

Furthermore, the first energy absorbing member 1a and the second energy absorbing member 1b may optionally have different configurations with each other in terms of the shape, the thickness, the material, the number of the recessed ribs, or the like in the scope of the target of the present invention.

Moreover, in the energy absorbing member 1 according to one embodiment of the invention, the second wall 4 of the other energy absorbing member 1b is superimposed on the first wall 3 of the first energy absorbing member 1a such that the recessed ribs 5, 6 thereof are disposed in series continuously in the direction to receive the impact energy from the inside or the outside of the vehicle so as to be disposed inside the vehicle constituent member 8 such as a door, a door trim, a body side panel of an automobile, or the like, a roof panel, a pillar, a bumper, a seat, an instrument panel, or the like as shown in FIGS. 24 to 27.

According to one embodiment, the recessed ribs 5 formed on the first wall 3 side of the first energy absorbing member 1a and the recessed ribs 6 formed on the second wall 4 side of the second energy absorbing member 1b are aligned or superimposed so as to have a plurality of the recessed ribs disposed in series, in one embodiment, as many ribs as possible are aligned. "In series" denotes that the recessed ribs 5, 6 are provided at adjacent positions with each other, and a further desired energy absorbing property can be obtained by superimposing, aligning or coupling the recessed ribs 5, 6 as many as possible adjacently. The ribs may be aligned serially, as disclosed, such that they are aligned coaxially so that an impact energy is distributed between and absorbed by the energy absorbing members.

Figure 19:
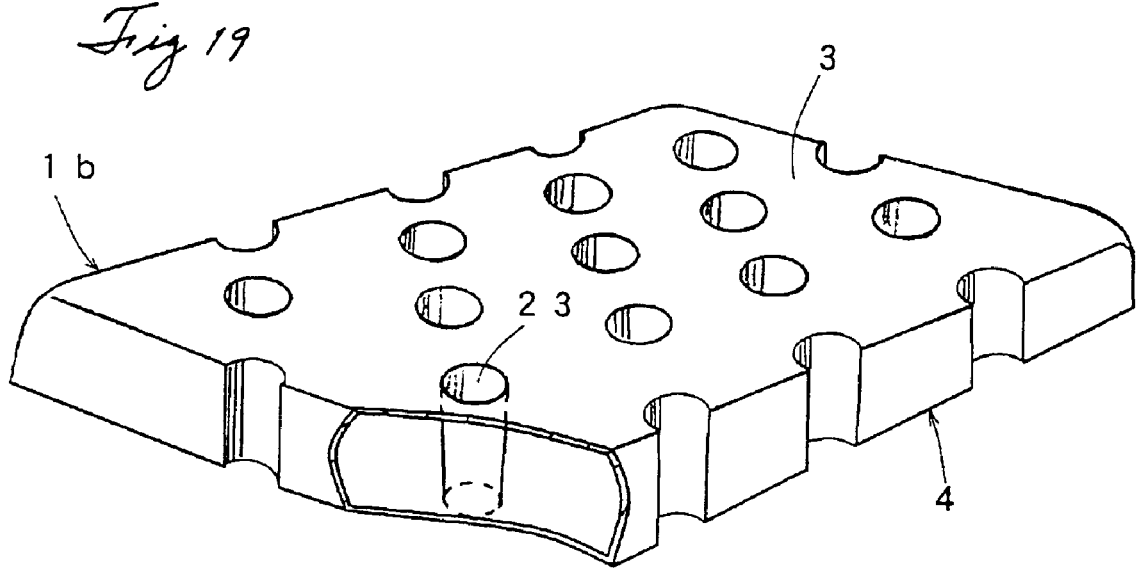
FIG. 19 is a partially broken perspective view of an energy absorbing member according to still another embodiment of the invention.
Figure 20:
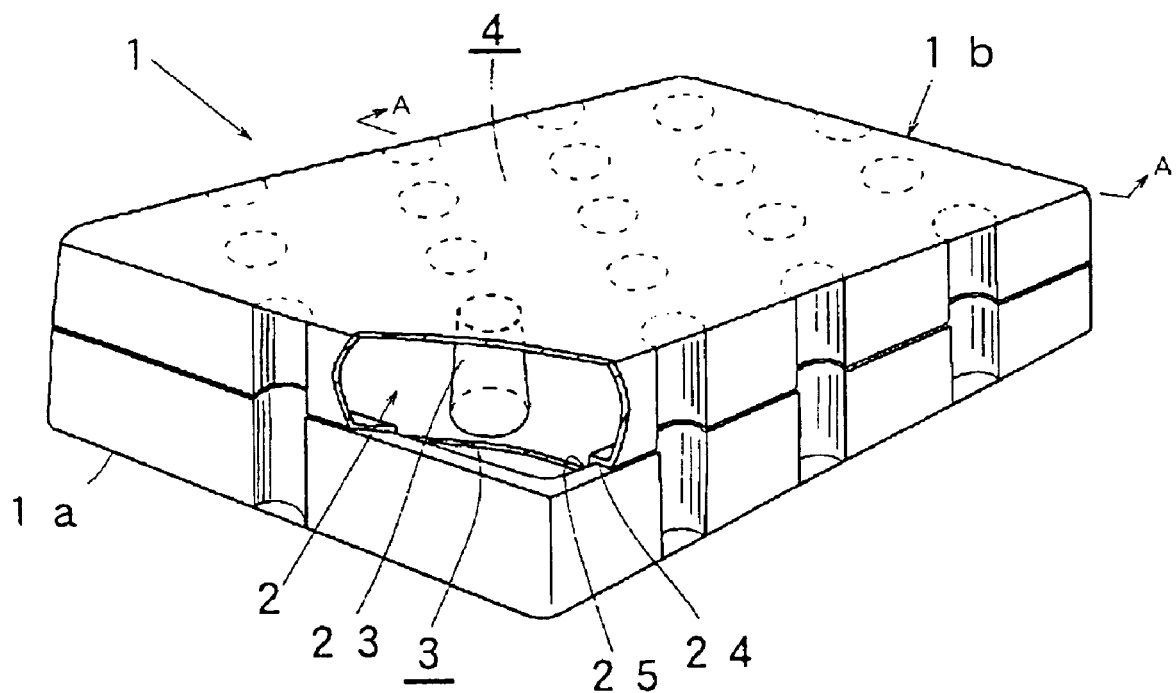
FIG. 20 is a partially broken perspective view of an energy absorbing member according to still another embodiment of the invention.
Figure 21:
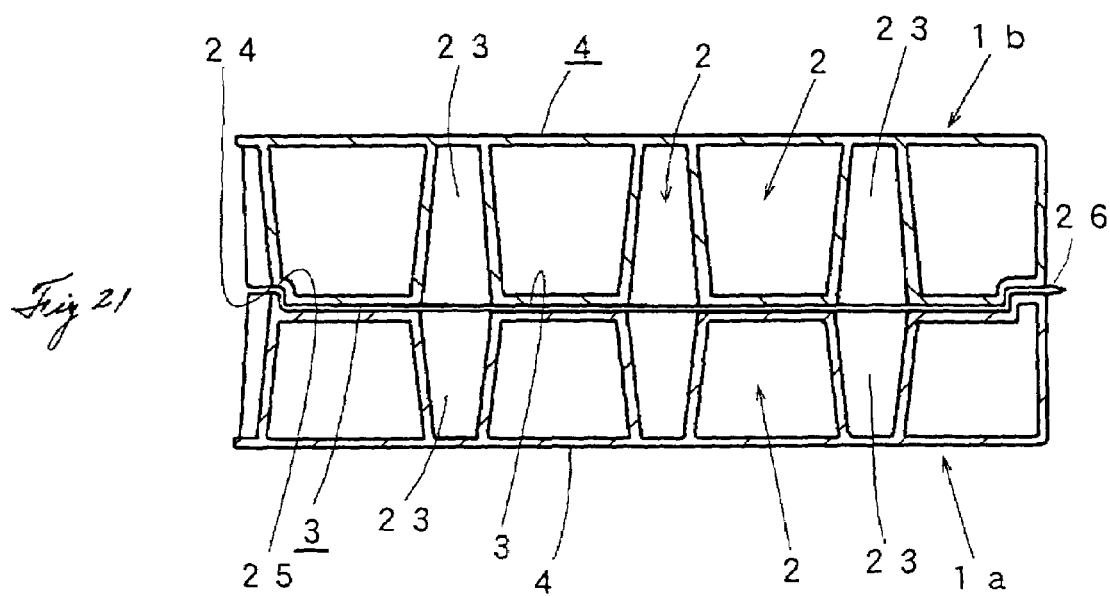
FIG. 21 is a cross-sectional view of an energy absorbing member according to one embodiment of the invention of FIG. 20.

According to one embodiment of the invention, as shown in FIGS. 19 to 21, the first energy absorbing member 1a and the second energy absorbing member 1b comprising the energy absorbing member 1 are provided in a configuration provided by denting the first wall 3 toward the second wall 4 direction, with the recessed ribs facing with each other with the top end parts bonded with the second wall 4, or by denting the second wall 4 toward the first wall 3 direction, with the top end parts bonded with the first wall 3.

Figure 4:
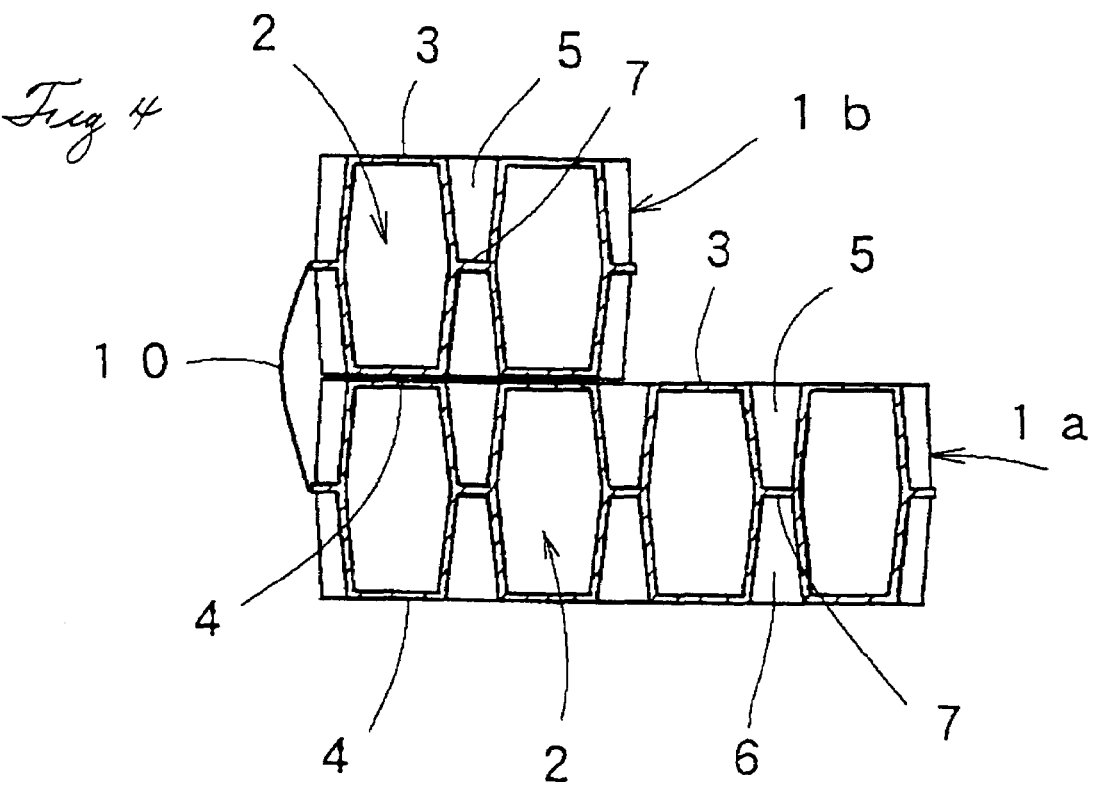
FIG. 4 is a cross-sectional view of an energy absorbing member according to another embodiment with a thin thickness part formed of the present invention.

As shown in FIG. 4, the energy absorbing member 1 according to one embodiment of the invention may be provided with the energy absorbing member 1a and the second energy absorbing member 1b interlocked by a thin part or living hinge 10. The thin part 10 serves as a hinge for maintaining the energy absorbing member 1a and the second energy absorbing member 1b integrally for improving the handling property and the assembly workability without preventing superimposition of the energy absorbing member 1a and the second energy absorbing member 1b.

Figure 7:
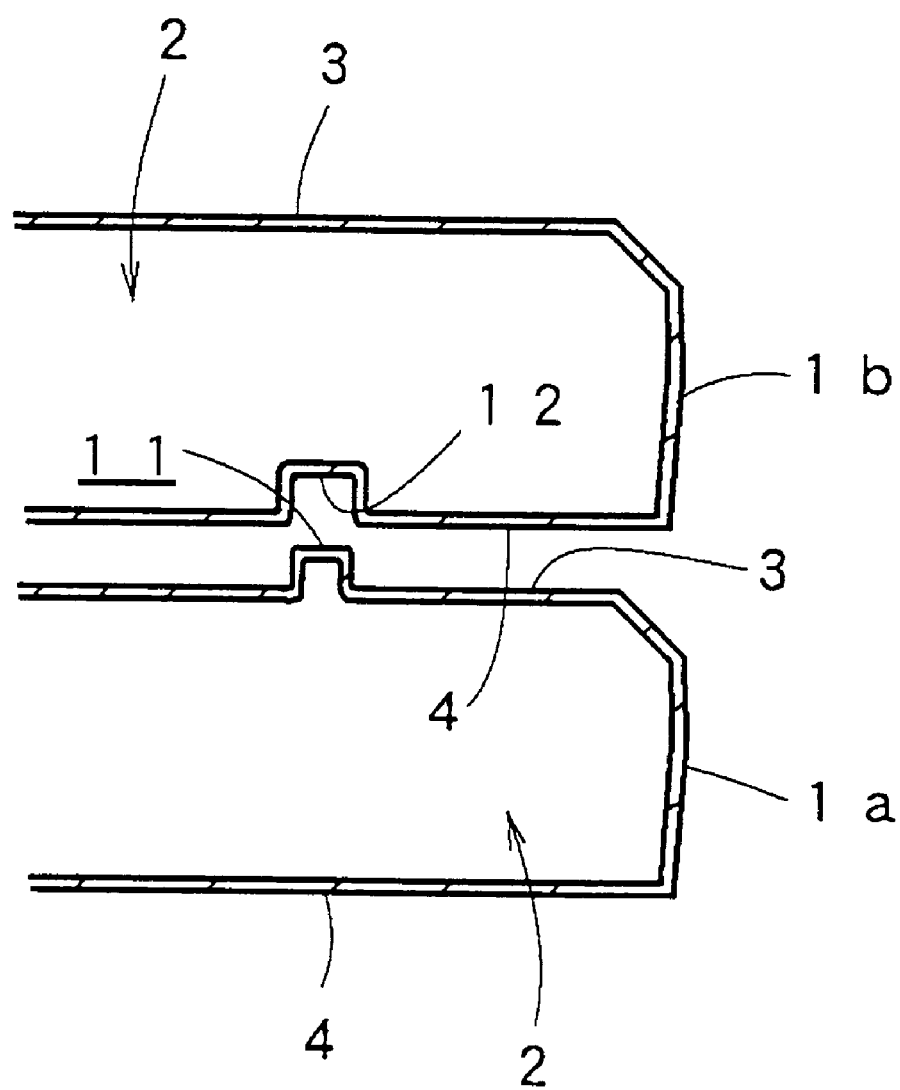
FIG. 7 is an enlarged cross-sectional view showing a step of interlocking an energy absorbing member according to one embodiment of the invention of FIG. 5.
Figure 8:
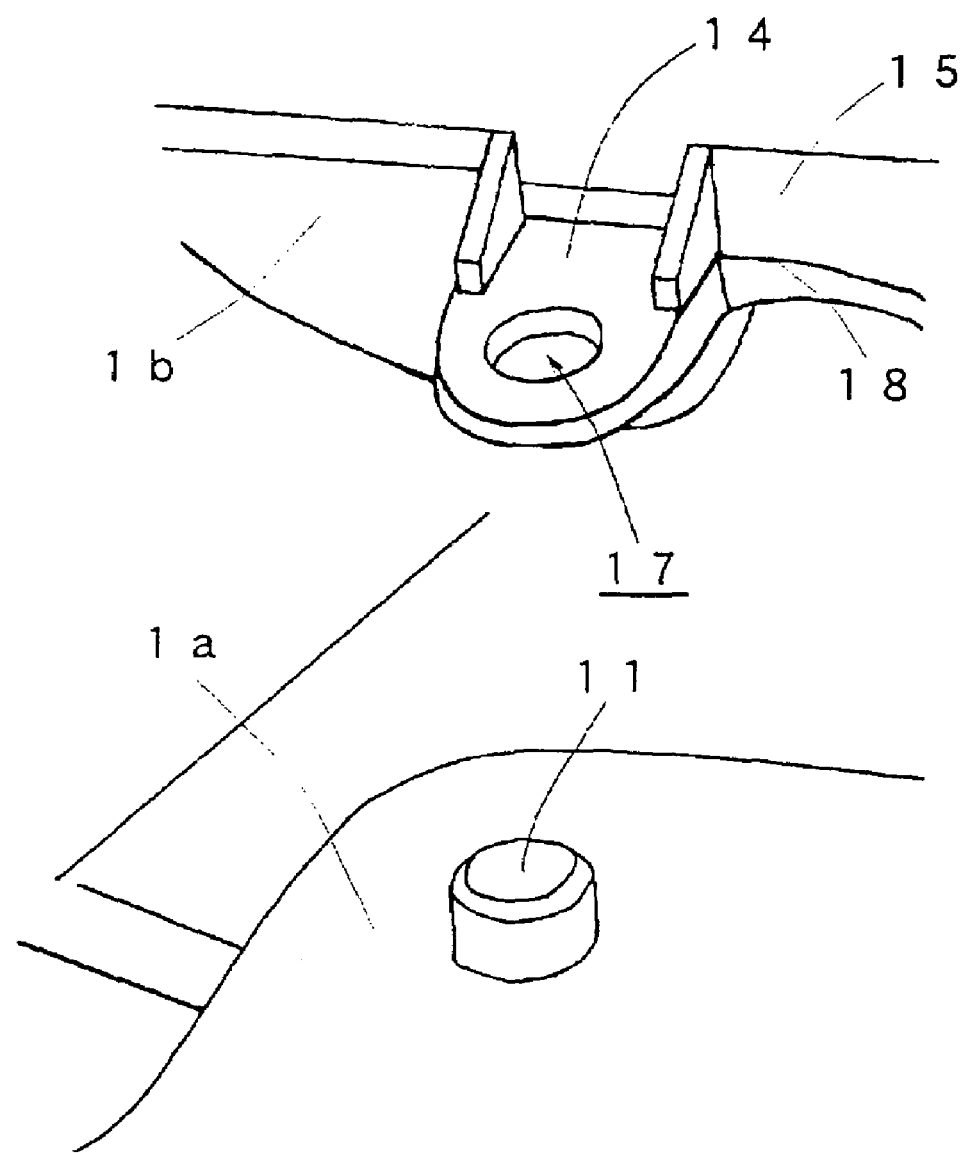
FIG. 8 is an enlarged view showing a detail of FIG. 5.

FIGS. 5 to 7 illustrate an energy absorbing member 1 according to one embodiment of the invention, a projecting part 11 is formed in the first wall 3 of the energy absorbing member 1a comprising thereof, and a receiving part corresponding to the projecting part 11 is formed in the projecting part 11 of the second wall 4 of the second energy absorbing member 1b. By superimposing the first energy absorbing member 1a and the second energy absorbing member 1b and fitting the projecting parts 11 of the first wall 3 of the first energy absorbing member 1a to the receiving parts of the second wall 4 of the second energy absorbing member 1b, the first energy absorbing member 1a and the second energy absorbing member 1b can be superimposed at a predetermined position. Moreover, the receiving parts may have its shape as a recessed part 12 or a through hole (not shown), corresponding to the projecting parts 11. In this case, by forming the recessed part 12 or the through hole according to the shape of the projecting parts 11, the projecting parts 11 and the recessed parts 12 or the through holes are stopped and fixed so that the first energy absorbing member 1a and the second energy absorbing member 1b can be interlocked and fixed integrally.

As shown in FIGS. 8 to 11, the receiving parts formed in the second wall 4 of the second energy absorbing member 1b may be provided as one comprising an interlocking piece 14 with a through hole 17 formed as shown in FIGS. 8 to 11.

According to one embodiment of the invention, the first energy absorbing member 1a and the second energy absorbing member 1b can be fitted by the projecting parts 11 and the receiving parts as mentioned above so as to be superimposed, coupled, fixed or otherwise aligned with each other at a predetermined position so that an energy absorbing member 1 having the excellent energy absorbing property can be produced as the entirety without the risk of displacement between the first energy absorbing member 1a and the second energy absorbing member 1b.

The first energy absorbing member 1a and the second energy absorbing member 1b superimposed at a predetermined position by fitting the projecting parts 11 and the receiving parts may further be fixed by a means of welding, bonding, screwing with a tapping screw, or the like.

As shown in FIGS. 8 to 16, according to one embodiment of the invention, the energy absorbing member 1 provides an interlocking piece or tab 14 formed integrally with the side surface 15 linking the first wall 3 and the second wall 4 of the first energy absorbing member 1a and/or the second energy absorbing member 1b. This tab or interlocking piece 14 may be connected to the member 1a by a "living" hinge. In the interlocking piece 14, a projecting part 11 or a through or permeating hole 17 may be disposed.

Figure 9:
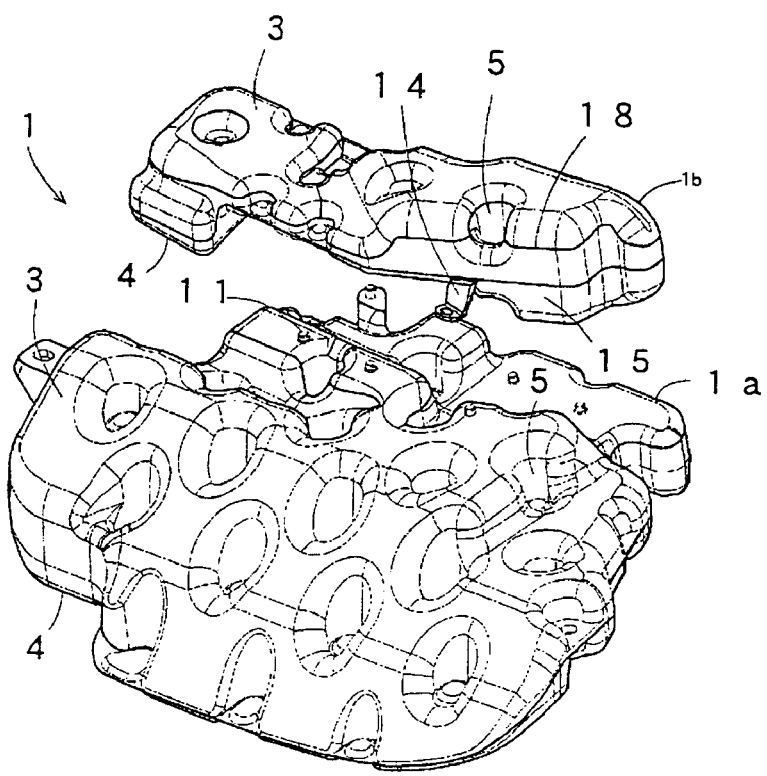
FIG. 9 is a perspective view of an energy absorbing member according to another embodiment with an interlocking piece formed according to one embodiment of the invention.
Figure 10:
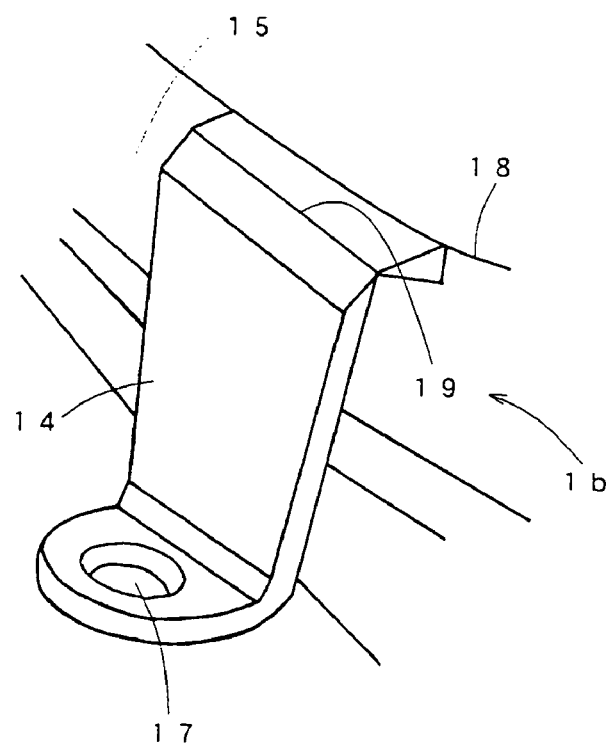
FIG. 10 is an enlarged view showing detail of FIG. 9.
Figure 11:
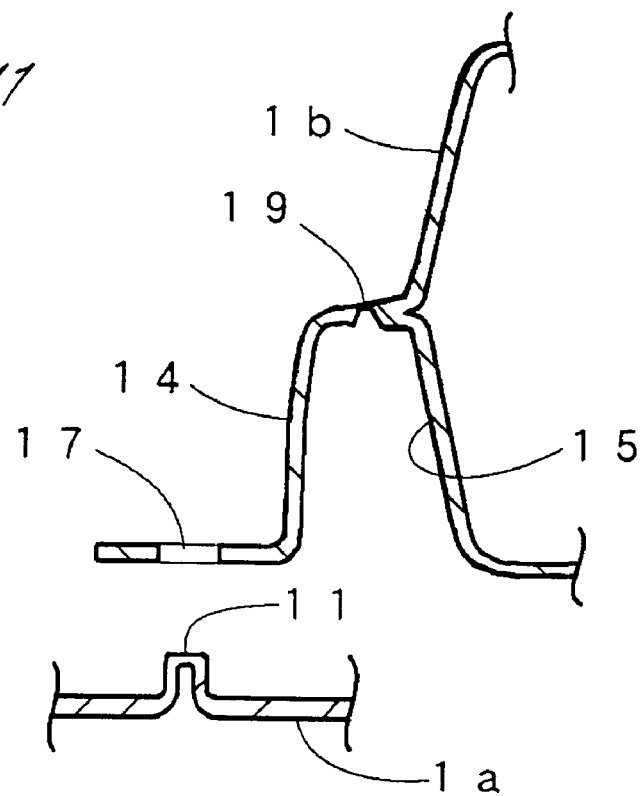
FIG. 11 is an enlarged cross-sectional view showing a step of interlocking an energy absorbing member according to one embodiment of the invention of FIG. 9.

In FIGS. 9 to 11, the interlocking piece 14 provided integrally via a thin part 19 and formed in the vicinity of the parting line 18 of the second energy absorbing member 1b is a solid member pressured and formed in the parting surface of the split mold at the time of blow molding. This thin part 19 forms a living hinge. In the first wall 3 of the first energy absorbing member 1a, the projecting parts 11 corresponding to the through holes 17 of the interlocking piece 14 such that the first energy absorbing member 1a and the second energy absorbing member 1b are interlocked integrally by fitting the through holes 17 of the interlocking pieces 14 of the other energy absorbing member 1b to the projecting parts 11 of the first energy absorbing member 1a.

The interlocking pieces 14 provided in the second energy absorbing member 1b may have recessed parts formed in addition to the through holes 17, and the first wall 3 of the first energy absorbing member 1a may have the projecting parts 11 corresponding to the recessed parts formed. Moreover, the interlocking pieces 14 provided in the second energy absorbing member 1b may have projecting parts for fitting and fixing formed therein, and the first wall 3 of the first energy absorbing member 1a may have recessed parts for fitting and fixing or a permeating hole formed.

Moreover, in the case wherein the interlocking pieces 14 are formed solidly, the interlocking pieces 14 are pressed and formed by the parting surface of the split molds. Since the energy absorbing member 1 is generally formed with the thickness evenly distributed by the blow molding, die matching should be carried out at the surface at the equal distance from the first wall 3 and the second wall 4. Therefore, the interlocking pieces 14 are formed in the substantially center in the thickness direction of the other energy absorbing member 1b disposed away from the superimposed first energy absorbing member 1a to be interlocked. According to one embodiment of the invention, since the interlocking pieces 14 are formed integrally via the thin parts 19, the interlocking pieces 14 can be interlocked in a state adjacent to the first energy absorbing member 1a to be interlocked by bending the thin parts 19, and thus displacement cannot be generated between the first energy absorbing member 1a and the second energy absorbing member 1b so that an energy absorbing member 1 having an energy absorbing property can be obtained as the entirety. The first energy absorbing member 1a to be interlocked with the interlocking pieces 14 may be fixed optionally by a means of welding, bonding, screwing with a tapping screw, or the like.

Figure 12:
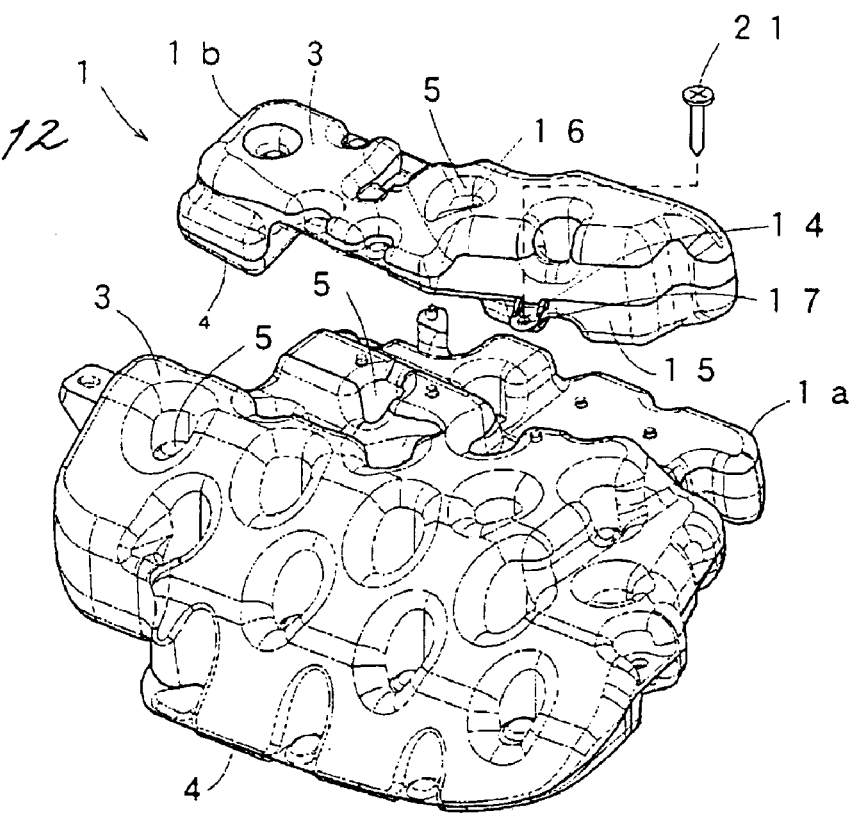
FIG. 12 is a perspective view of an energy absorbing member according to another embodiment to be interlocked by a stopping member of one embodiment of the invention.
Figure 13:
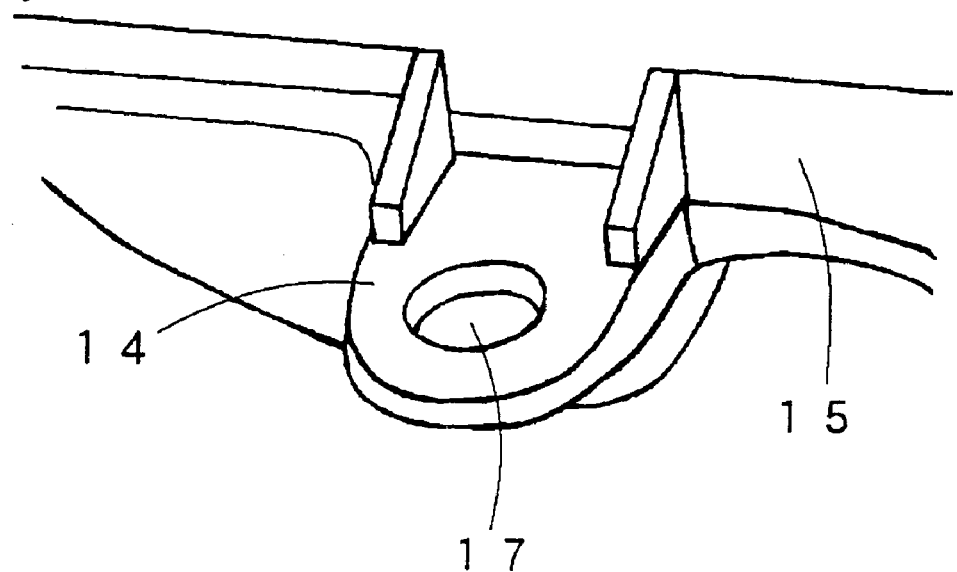
FIG. 13 is an enlarged view showing detail of FIG. 12.
Figure 14:
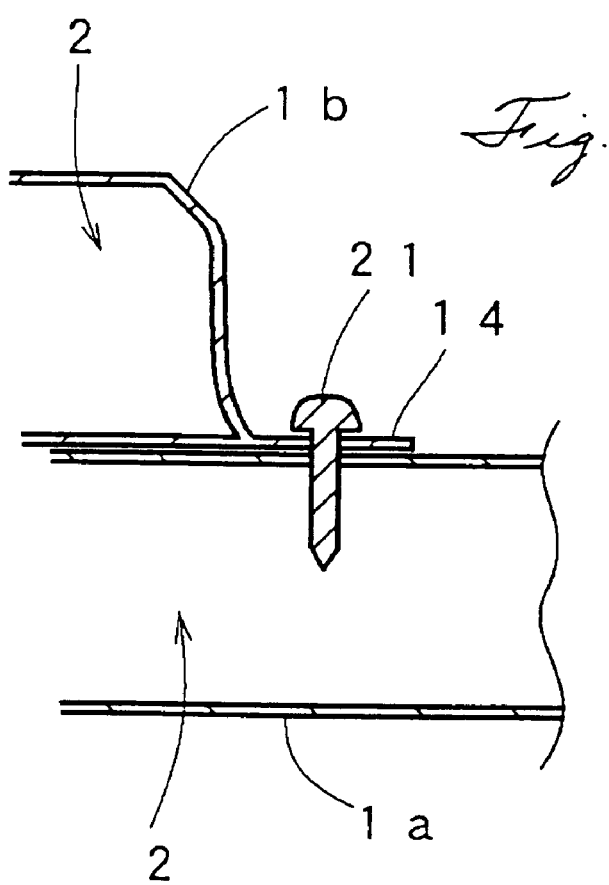
FIG. 14 is an enlarged cross-sectional view showing a part of the energy absorbing member according to one embodiment of the invention of FIG. 12.

As shown in FIGS. 12 to 14, the second energy absorbing member 1b has the second wall 4 thereof superimposed and contacted with the first wall 3 of the first energy absorbing member 1b so that a tapping screw 21 as the stopping member is inserted through the through hole 17 of the interlocking piece 14 of the second energy absorbing member 1b for fixing with the tapping screw 21 upright on the first wall 3 of the first energy absorbing member 1b, and thereby the first energy absorbing member 1a and the second energy absorbing member 1b are interlocked and fixed integrally for providing the energy absorbing member 1. The interlocking piece 14 provided in the second energy absorbing member 1b may have a recessed part for inserting through the tapping screw 21 or a thin film part formed in addition to the through hole 17 (not shown). Moreover, the stopping may be an optional member such as a rivet in addition to the tapping screw 21.

Figure 15:
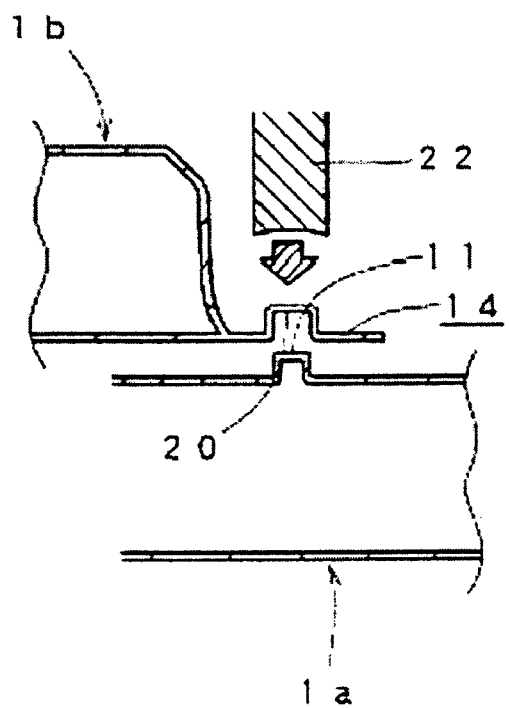
FIG. 15 is a cross-sectional view showing a step of interlocking an energy absorbing member according to one embodiment of the invention by thermally welding.
Figure 16:
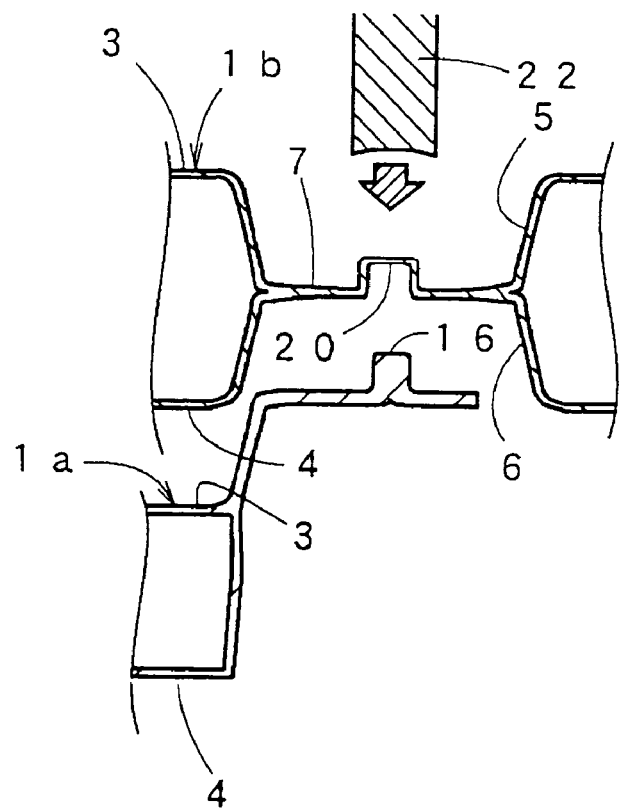
FIG. 16 is a cross-sectional view showing a step of interlocking an energy absorbing member according to one embodiment of the invention by thermally welding.

In FIGS. 15 and 16, a projecting part 11 is formed in the first wall 3 of the first energy absorbing member 1a, and a recessed part 20 is formed corresponding to the projecting part 11 in the interlocking piece 14 formed in the second energy absorbing member 1b. By superimposing the first energy absorbing member 1a and the second energy absorbing member 1b, fitting the projecting part 11 of the first wall 3 of the first energy absorbing member 1a with the recessed part 20 of the interlocking piece 14 of the second energy absorbing member 1b, pressing and thermally welding the fitting part thereof by a heating member 22 for bonding the second energy absorbing member 1b with the first energy absorbing member 1a, an integral energy absorbing member 1 is provided.

Although the projecting parts 11 are formed in the first wall 3 of the first energy absorbing member 1a so as to be fitted into the recessed parts of the interlocking pieces 14 of the second energy absorbing member 1b, in a way analogous to the embodiment shown in the previous figures, wherein a configuration of forming a permeating or through hole 17 in the interlocking pieces 14 of the second energy absorbing member 1b for fitting the permeating holes with the projecting parts 11 of the first wall 3 of the first energy absorbing member 1a may be employed as well. Moreover, a configuration of forming the interlocking pieces 14 in the first energy absorbing member 1a and the second energy absorbing member 1b and forming a projecting part in the first energy absorbing member 1a to be fitted with the recessed parts of the interlocking pieces 14 of the second energy absorbing member 1b may be employed. Furthermore, it is also possible to form a recessed part 20 in the welded surface 7 of the recessed ribs 5, 6 of the second energy absorbing member and for a projecting part corresponding thereto in the interlocking pieces 14 of the first energy absorbing member 1a. In the embodiment shown in FIG. 16, the projecting part 16 is solid by increasing the resin amount for thermal welding.

The term "stopping member" is generally used to describe a fastener. Examples of such fasteners include but are not limited to screws, rivets, nails, pins, staples, and other such mechanical means for fixing or attaching two components.

Figure 17:
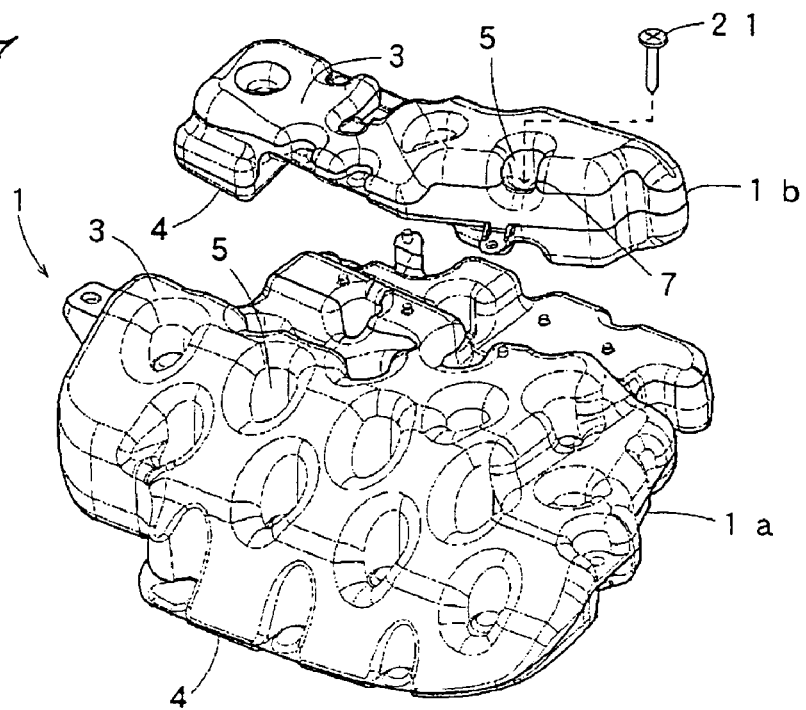
FIG. 17 is a perspective view of an energy absorbing member according to another embodiment to be interlocked by a stopping member of another embodiment of the invention.
Figure 18:
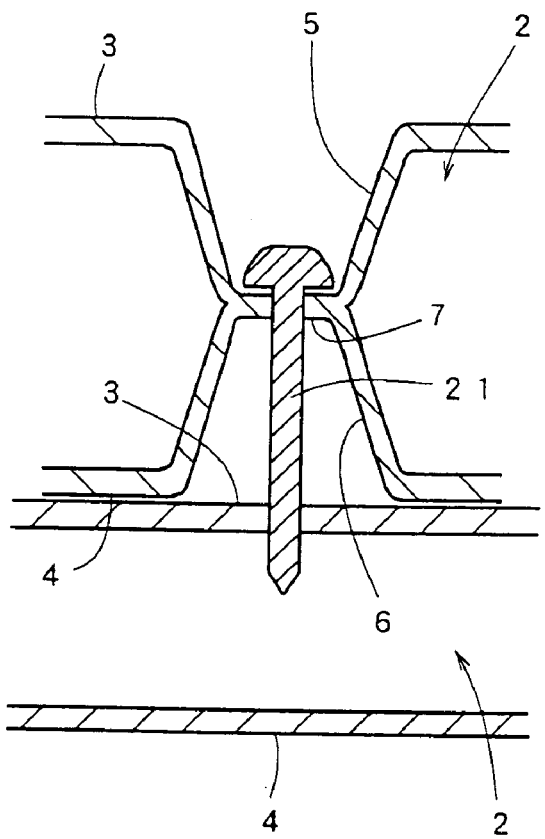
FIG. 18 is an enlarged cross-sectional view showing a part of the energy absorbing member according to one embodiment of the invention of FIG. 17.

According to the energy absorbing member 1 of one embodiment of the invention, as shown in detail in FIGS. 17 and 18, the welded surface 7 of the recessed ribs 5, 6 of the second energy absorbing member 1b and the first wall 3 of the first energy absorbing member la are interlocked by the tapping screw 21 as the stopping member so as to provide the first energy absorbing member 1a and the second energy absorbing member 1b integrally. A part of a large number of the recessed ribs 5, 6 formed in the second energy absorbing member 1b may be interlocked with the first wall 3 of the first energy absorbing member 1a by the tapping screws 21. Stopping, attaching, or fixing members other than the tapping screw may be used.

The first energy absorbing member 1a and the second energy absorbing member 1b are to be superimposed such that the recessed ribs 5, 6 formed in the second energy absorbing member 1b correspond to the first wall 3 of the first energy absorbing member 1a. According to the energy absorbing member 1 of one embodiment of invention, the first energy absorbing member 1a and the second energy absorbing member 1b are interlocked with each other by the tapping screws 21 as the stopping member between the welded surface 7 of the recessed ribs 5, 6 of the second energy absorbing member 1b and the first wall 3 of the first energy absorbing member 1a as mentioned above, and thus an energy absorbing member 1 having the excellent energy absorbing property as the entirety can be obtained without generating displacement between the first energy absorbing member 1a and the second energy absorbing member 1b.

Figure 28:
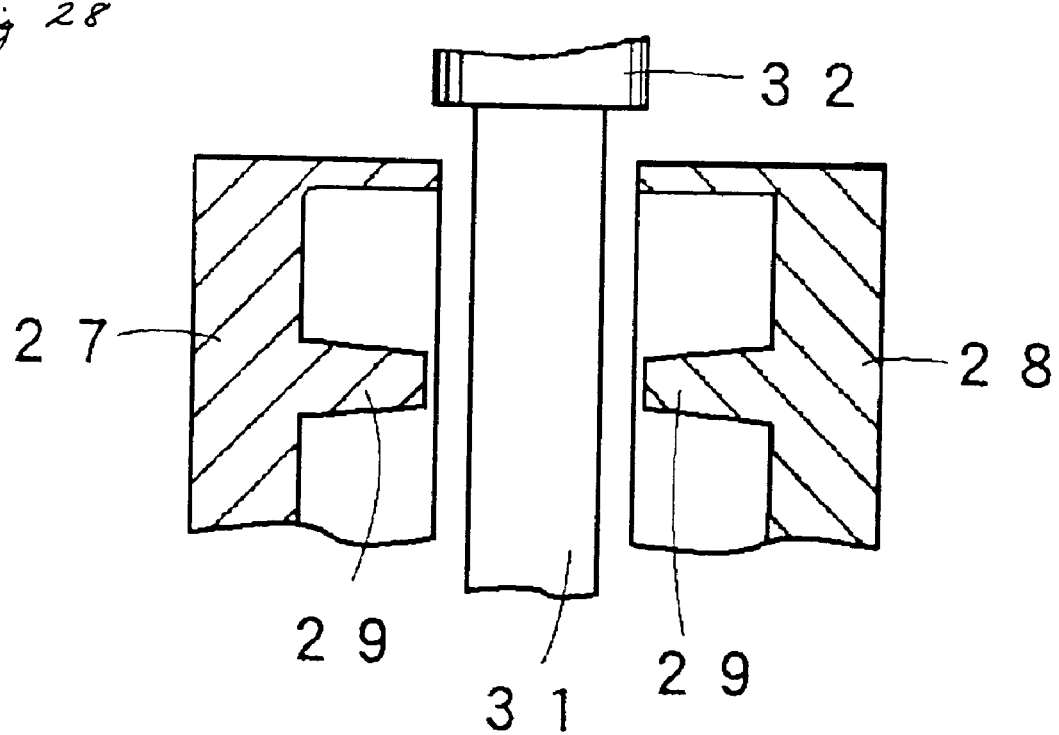
FIG. 28 is a view showing a first step for molding an energy absorbing member according to one embodiment of the invention by blow molding.
Figure 29:
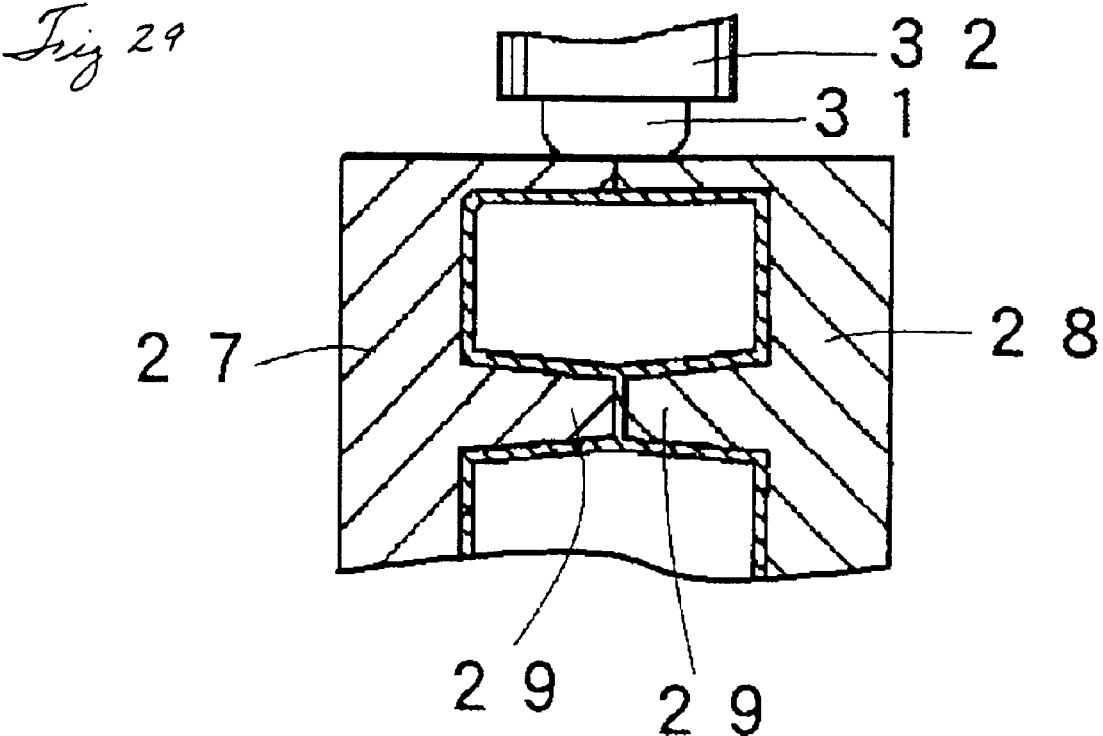
FIG. 29 is a view showing a second step for molding an energy absorbing member according to one embodiment of the invention by blow molding.

The energy absorbing member 1 according to one embodiment of the invention is blow molded as shown in FIGS. 28 and 29. The reference numerals 27, 28 are a pair of split molds. The split molds 27, 28 are provided with recessed rib forming parts 29 for forming the recessed ribs 5, 6. The reference numeral 31 denotes a parison, and 32 an extrusion head.

The energy absorbing member can be positioned in various orientations. Therefore, the terms first wall 3 and second wall 4, and energy absorbing member or first energy absorbing member 1a and the second energy absorbing member or second energy absorbing member 1b are defined by their relationships to each other, rather than by a specific, objective orientation. Thus in some embodiments, both walls may be vertical, while in others the walls may be disposed at some angle or be horizontal. In the latter case, either the first 3 or second 4 walls may be on top, and either the first energy absorbing member 1a or the second energy absorbing member 1b could be disposed on top. One of ordinary skill in the art will readily appreciate that other embodiments where additional energy absorbing members are attached or coupled to the first or second energy absorbing member, resulting in a wide variety of configurations, all within the scope of the present invention.

FIGS. 19 to 23 are provided to illustrate an energy absorbing member according to another embodiment of the invention. In FIG. 20, the reference numeral 1 denotes an energy absorbing member. The energy absorbing member 1 is formed integrally by superimposing aligning, coupling, welding or fixing the first energy absorbing member 1a and the second energy absorbing member 1b. According to the energy absorbing member 1, recessed ribs 23 of the first energy absorbing member 1a and the second energy absorbing member 1b comprising the same are provided by denting or impressing the first wall 3 toward the second wall 4 direction facing with each other so as to bond the top end part thereof with the second wall 4, or denting the second wall 4 toward the first wall 3 direction so as to bond the top end part with the first wall 3 (see FIG. 19) during the blow molding process.

The recessed ribs 23 are, according to one embodiment formed in a tapered shape. Other embodiments include but are not limited to columnar ribs, elongate ribs, solid ribs, and non-recessed ribs. One skilled in the art will readily appreciate that other configurations of molded ribs would be within the scope of the present invention. According to one embodiment, the second energy absorbing member 1b has the same configuration as the first energy absorbing member 1a.

The energy absorbing member 1 of one embodiment of the invention is formed integrally by superimposing or fixing the first wall 3 of the second energy absorbing member 1b onto the first wall of the first energy absorbing member 1a. The opening surfaces of the recessed ribs 23 of the first energy absorbing member 1a are closed by the first wall 3 of the second energy absorbing member 1b, and those of the recessed ribs 23 of the second energy absorbing member 1b are closed by the first wall 3 of the first energy absorbing member 1a so that the recessed ribs 23 have a closed hollow part with each other. The inclination angle θ of the recessed ribs 23 formed in a tapered shape is about 3° to 10° (see FIG. 22).

A recessed part 25 is formed on the first wall 3 side of the first energy absorbing member 1a comprising the energy absorbing member 1, and a projecting part 24 is formed on the first wall 3 side of the second energy absorbing member 1b, respectively so that the first energy absorbing member 1a and the second energy absorbing member 1b superimposed are fitted with each other by the recessed part 25 and the projecting part 24 so as to maintain the integral configuration. The recessed part 25 and projecting part 24 for fitting may be formed with the first energy absorbing member 1a and the second energy absorbing member 1b provided oppositely.

The first energy absorbing member 1a and the second energy absorbing member 1b comprising the energy absorbing member 1 may be integrated by bonding, welding, fastening by a pin or clip, or screwing the first wall 3 of the first energy absorbing member 1a and the first wall 3 of the second energy absorbing member 1b, in addition to superimposing or coupling and fitting as mentioned herein. Furthermore, the first energy absorbing member 1a and the second energy absorbing member 1b can be interlocked and fixed integrally by forming an interlocking piece as in the configuration explained above with reference to FIGS. 5 to 18, and explanation thereof is omitted here.

Figure 22:
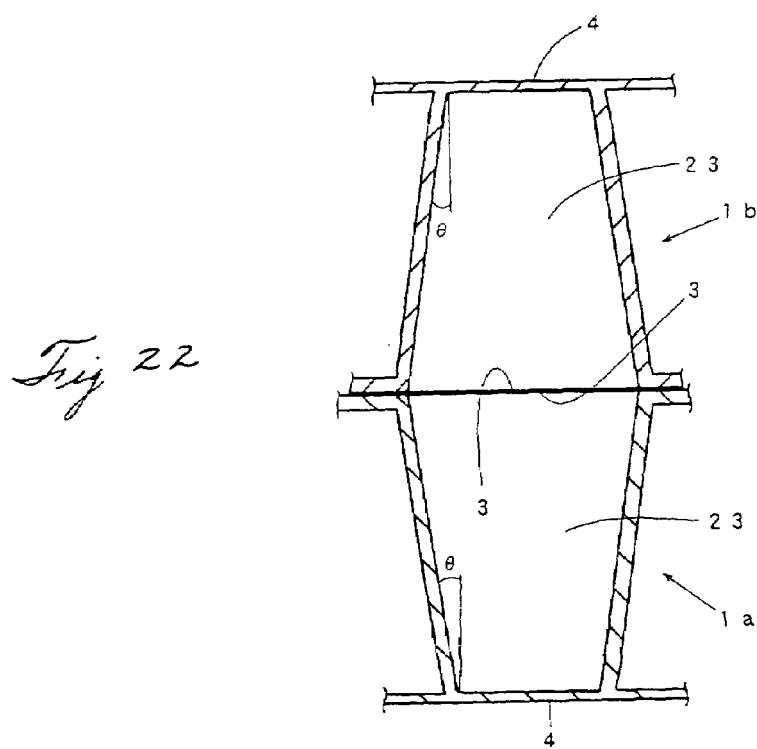
FIG. 22 is a cross-sectional view showing a part of the energy absorbing member according to one embodiment of the invention of FIG. 20.
Figure 23:
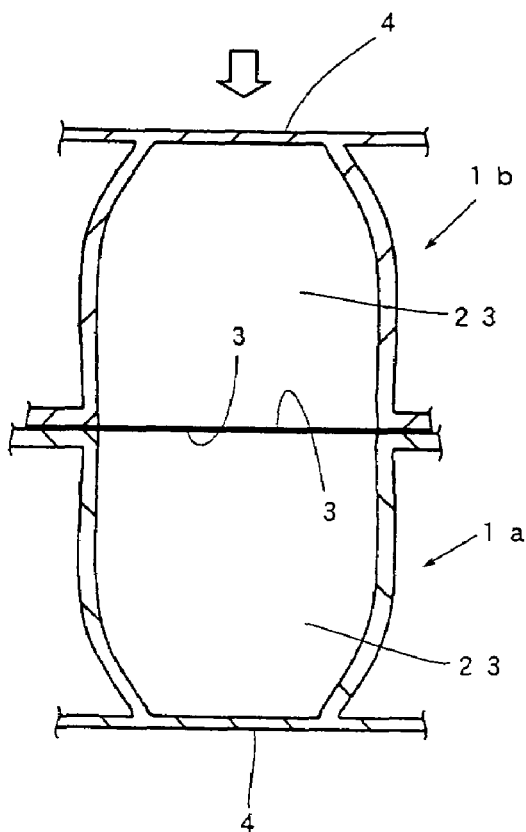
FIG. 23 is a schematic diagram showing the state with an impact energy applied to the recessed rib of FIG. 22.

In one embodiment, it is important to form the recessed ribs 23 formed on the first wall 3 side of the first energy absorbing member 1a and the recessed ribs 23 formed on the first wall 3 side of the second energy absorbing member 1b in series for obtaining a desired energy absorbing property (see FIGS. 22, 23). However, even in the case they are not provided in series, a desired energy absorbing property can be obtained as well.

Figure 30:
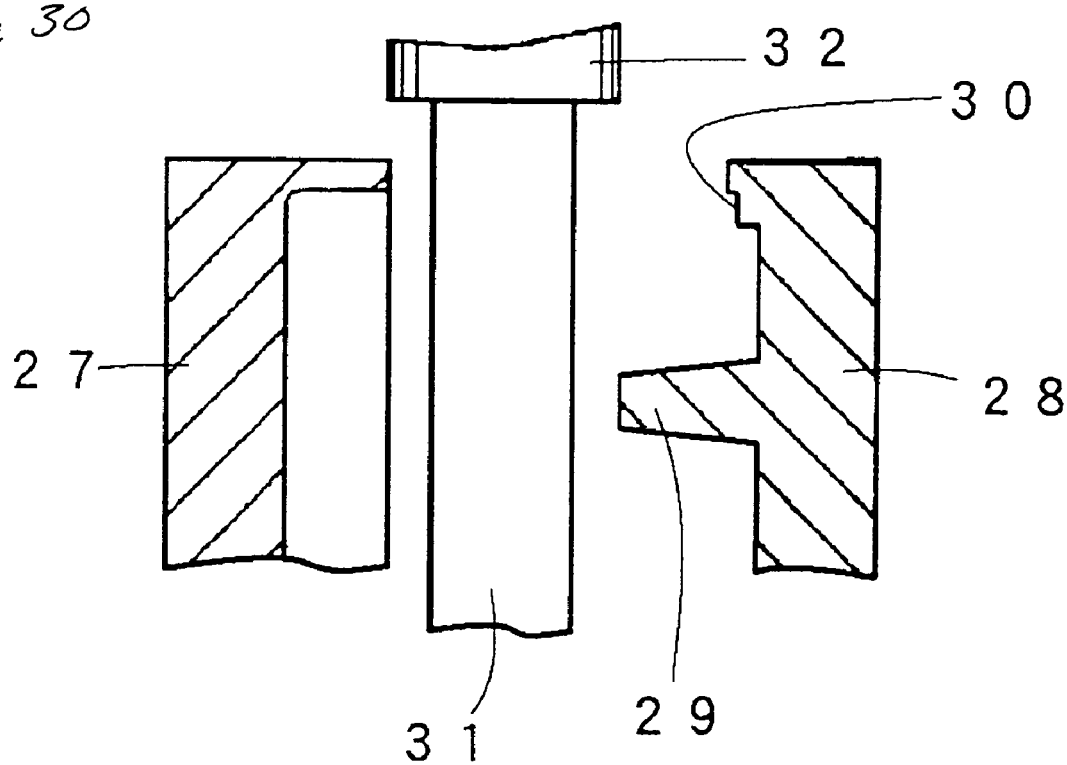
FIG. 30 is a view showing a first step for molding an energy absorbing member according to another embodiment of the invention by blow molding.
Figure 31:
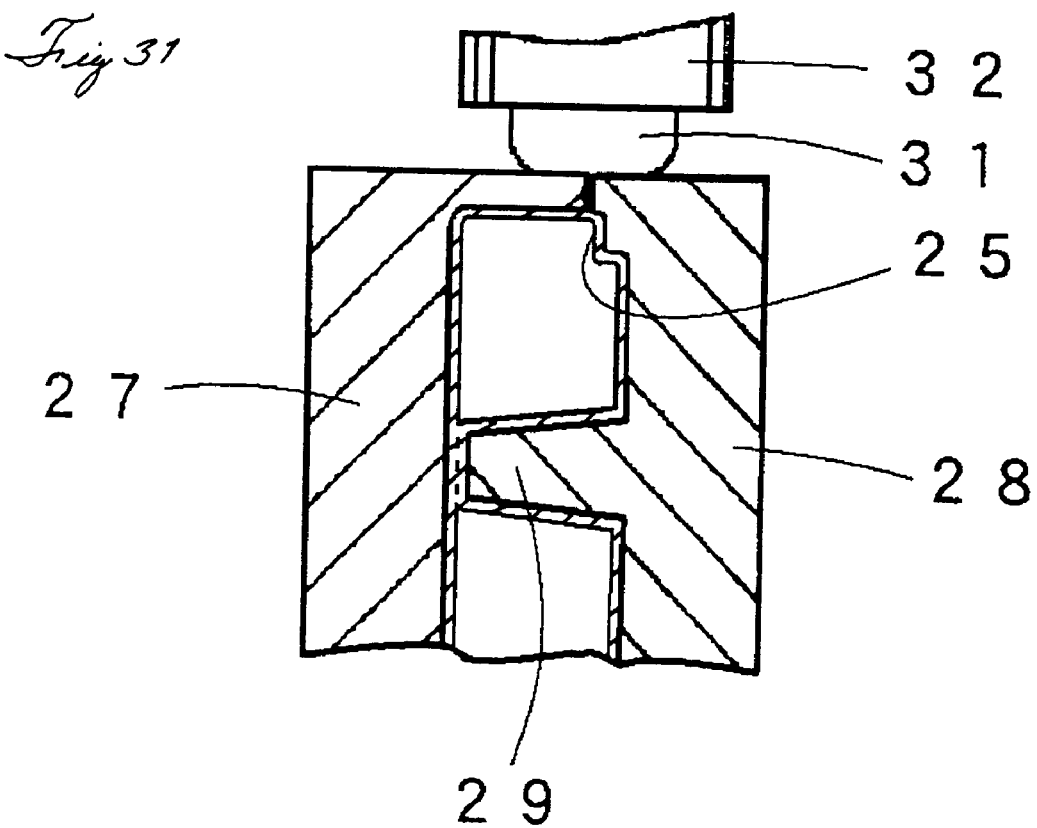
FIG. 31 is a view showing a second step for molding an energy absorbing member according to another embodiment of the invention by blow molding.

Although the first energy absorbing member 1a and the second energy absorbing member 1b comprising the energy absorbing member 1 of one embodiment of the invention may be formed by blow molding independently, it is possible to form them by blow molding integrally and then superimposed via a thin part or living hinge 26 as shown in FIG. 21. FIGS. 30 and 31 show the blow molding embodiment. The reference numerals 27, 28 denote a pair of split molds, with a projecting part 29 for forming a recessed rib 23 and a stepwise part 30 for forming a recessed part 25 provided in the split mold 28. The reference numeral 31 denotes a parison, and 32 a protruding head.

According to the energy absorbing member 1 of one embodiment of the invention, since the first wall 3 of the first energy absorbing member 1 and the first wall 3 of the second energy absorbing member 1 comprising the same are formed integrally by being superimposed with the recessed ribs 23 provided in a closed state, and furthermore, the recessed ribs 23 of the first energy absorbing member 1a formed by denting from the first wall 3 toward the second wall 4 are provided in a tapered shape and the recessed ribs 23 formed by denting from the first wall 3 toward the second wall 4 of the second energy absorbing member 1b are provided in a tapered shape, the recessed ribs 23 are not bent in the "L" shape at the time of receiving the impact energy so that a high energy absorbing property can be obtained.

According to one embodiment, the thermoplastic resin is a resin having high mechanical strength and rigidity. Examples thereof include a polyolefin resin such as a polyethylene resin and a polypropylene resin, a styrene resin such as a polystyrene resin, an acrylonitrile-butadiene-styrene copolymer (ABS resin), an acrylonitrile-styrene resin (AS resin) and an acrylonitrile-acrylic rubber-styrene copolymer (AAS resin), a polyester resin such as a polyethylene terephthalate, a polycarbonate resin, a polyamide resin, a polyphenylene ether resin (PPO resin), and a blended composite thereof.

Figure 25:
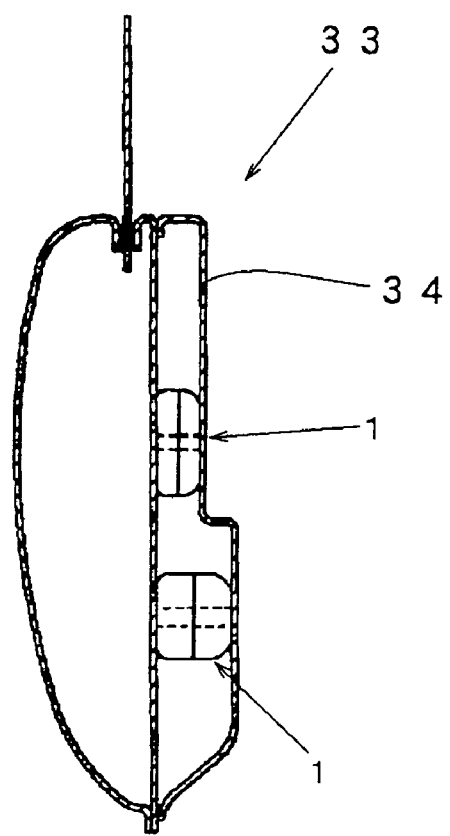
FIG. 25 is a cross-sectional view showing an embodiment with an energy absorbing member according to one embodiment of the invention provided inside a door trim of a vehicle.
Figure 26:
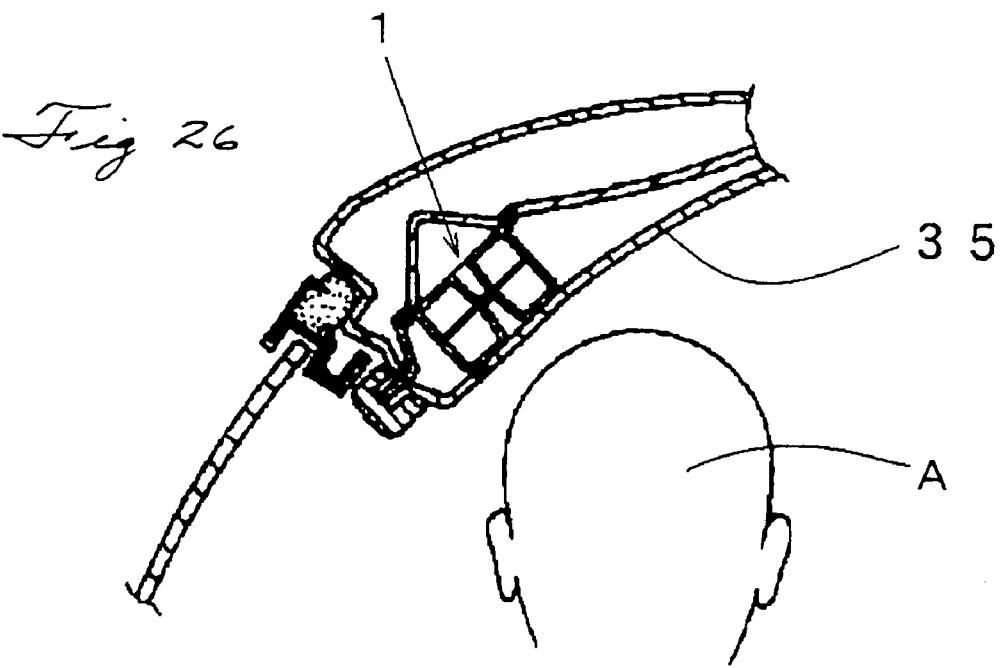
FIG. 26 is a cross-sectional view showing an embodiment with an energy absorbing member according to one embodiment of the invention provided inside a rear pillar of a vehicle.
Figure 27:
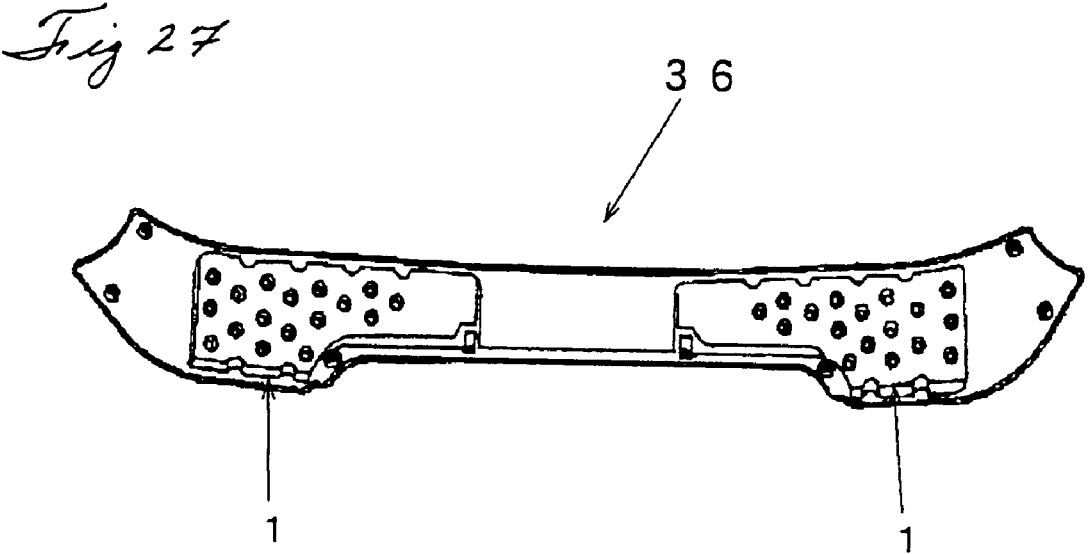
FIG. 27 is a rear view of a rear bumper with an energy absorbing member according to one embodiment of the invention provided therein.

The energy absorbing member 1 according to one embodiment of the invention is provided inside a vehicle structural member such as a door of, a door trim, a body side panel, a roof panel, a pillar, a bumper, a seat, and an instrument panel an automobile, or the like. FIG. 25 shows an embodiment of providing the energy absorbing member 1 according to one embodiment of the invention inside a door trim 34 of a door 33, FIG. 26 shows an embodiment of providing the same inside a rear pillar 35 of an automobile, and FIG. 27 shows an embodiment of providing the same inside a rear bumper 36, respectively. In FIG. 26, the mark A denotes the head of a passenger.

As heretofore explained, the energy absorbing member according to one embodiment of the invention can be used preferably as a member for absorbing the impact energy of the collision, or the like by being disposed inside a vehicle structural member such as a door, a door trim, a body side panel, a roof panel, a pillar, a bumper, a seat, and an instrument panel of an automobile, or the like.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

We claim:

1. A system for absorbing an impact energy, said system comprising:

first and second blow molded thermoplastic energy absorbing members;

each of said first and said second energy absorbing members having opposing first and second walls defining a hollow space;

at least one pair of coaxially joined first and second three dimensional ribs disposed within each said first and said second energy absorbing members, said first ribs being integrally molded from and directly connected to said first wall and extending from said first wall into said hollow space, said second ribs being integrally molded from and directly connected to said second wall and extending from said second wall into said hollow space so as to couple said first ribs;

at least one welded surface fusing said first and second ribs at a junction disposed at an opposite end of said first ribs from said first wall and at an opposite end of said second ribs from said second wall, said at least one welded surface being directly disposed between and joining said first and said second ribs; and wherein said first and second energy absorbing members are aligned such that said at least one pair of coaxially joined first and second three dimensional ribs of said first energy absorbing member are coaxially aligned with said at least one pair of coaxially joined first and second three dimensional ribs of said second energy absorbing member so that said impact energy is distributed between said energy absorbing members and absorbed by said energy absorbing members;

a projecting part is disposed in said first wall of said first energy absorbing member, and a receiving part for receiving said projecting part is disposed in the second wall of said second energy absorbing member such that when said projecting part mates with said receiving part, said first and said second impact absorbing members are aligned.

2. The system according to claim 1, wherein said first energy absorbing member and said second energy absorbing member have different sizes.

3. The system according to claim 1, wherein said first energy absorbing member and said second energy absorbing member are interlocked with each other via a thin part.

4. The system according to claim 1, wherein the receiving part is a recessed part.

5. The system according to claim 1, wherein the receiving part is a through hole.

6. The system according to claim 1, wherein an interlocking piece is disposed on at least one of said energy absorbing members in such a way as to align said first and second energy absorbing members.

7. The system according to claim 6, wherein said projecting part is formed in said interlocking piece.

8. The system according to claim 6, wherein a through hole is formed in said interlocking piece.

9. The system according to claim 6, wherein said interlocking piece is formed integrally on a side surface of at least one of said energy absorbing members via a thin part.

10. The system according to claim 6, wherein said interlocking piece is formed in the vicinity of a parting line formed on a side surface linking said first and second wall of at least one of said energy absorbing members.

11. The system according to claim 6, wherein said interlocking piece is pressed and formed by a parting surface of a split mold during blow molding.

12. The system according to claim 6, wherein a plurality of said energy absorbing members are interlocked and fixed by fixing said interlocking piece to an adjacent at least one of said energy absorbing members.

13. The system according to claim 6, further comprising a stopping member coupling said interlocking piece to an adjacent at least one of said energy absorbing members.

14. The system according to claim 6, wherein a plurality of said energy absorbing members are interlocked and fixed by fitting said interlocking piece to an adjacent at least one of said energy absorbing members.

15. The system according to claim 6, wherein a plurality of said energy absorbing members are interlocked and fixed integrally by welding said interlocking piece to an adjacent at least one of said energy absorbing members.

16. The system according to claim 6, wherein a plurality of the energy absorbing members are interlocked and fixed by coupling a first said interlocking piece from one said energy absorbing member to a second said interlocking piece from an adjacent at least one of said energy absorbing members.

17. The system according to claim 16, further comprising a stopping member inserted through said first and second interlocking pieces.

18. The system according to claim 16, wherein a plurality of said interlocking pieces are snapped together.

19. The system according to claim 16, wherein a plurality of said interlocking pieces are welded together.

20. The system according to claim 1, further comprising a stopping member inserted through at least one of said at least one welded surface.

* * * * *

UNITED STATES PATENT AND TRADEMARK OFFICE
CERTIFICATE OF CORRECTION

| | | |
|---|---|---|
| PATENT NO. | : 7,143,876 B2 | |
| APPLICATION NO. | : 10/698314 | |
| DATED | : December 5, 2006 | |
| INVENTOR(S) | : Teruo Tamada et al. | |

It is certified that error appears in the above-identified patent and that said Letters Patent is hereby corrected as shown below:

Column 12,

Line 39, delete "ribs", insert --rib--

Line 42, delete "ribs", insert --rib--

Line 45, delete "ribs", insert --rib--

Line 46, delete "at least one", insert --a--

Line 48, delete "ribs", insert --rib--

Line 49, delete "ribs", insert --rib--

Line 49, delete "at least one"

Column 13,

Line 15, delete "said", insert --a--

Signed and Sealed this

Twenty-fourth Day of March, 2009

JOHN DOLL
*Acting Director of the United States Patent and Trademark Office*